United States Patent
Aieta et al.

(10) Patent No.: US 11,256,022 B2
(45) Date of Patent: Feb. 22, 2022

(54) POLARIZATION RECYCLING BACKLIGHT, METHOD AND MULTIVIEW DISPLAY EMPLOYING SUBWAVELENGTH GRATINGS

(71) Applicant: LEIA INC., Menlo Park, CA (US)

(72) Inventors: Francesco Aieta, Menlo Park, CA (US); Xuejian Li, Menlo Park, CA (US); Thomas Hoekman, San Mateo, CA (US); David A. Fattal, Mountain View, CA (US)

(73) Assignee: LEIA INC., Menlo Park, CA (US)

( * ) Notice: Subject to any disclaimer, the term of this patent is extended or adjusted under 35 U.S.C. 154(b) by 25 days.

(21) Appl. No.: 16/926,739

(22) Filed: Jul. 12, 2020

(65) Prior Publication Data
US 2020/0341182 A1 Oct. 29, 2020

Related U.S. Application Data

(63) Continuation of application No. PCT/US2018/015617, filed on Jan. 27, 2018.

(51) Int. Cl.
 *F21V 8/00* (2006.01)
(52) U.S. Cl.
 CPC ......... *G02B 6/0056* (2013.01); *G02B 6/0043* (2013.01)
(58) Field of Classification Search
 CPC .............................. G02B 6/0056; G02B 6/0043
 USPC ........................................................... 362/19
 See application file for complete search history.

(56) References Cited

U.S. PATENT DOCUMENTS

| | | | |
|---|---|---|---|
| 6,020,944 A | 2/2000 | Hoshi | |
| 7,538,340 B2* | 5/2009 | Pang | G02B 6/0031 257/13 |
| 7,661,833 B2 | 2/2010 | Yang et al. | |
| 8,681,423 B1 | 3/2014 | Gibson et al. | |
| 8,702,287 B2* | 4/2014 | Ohno | F21S 41/155 362/516 |
| 9,128,226 B2 | 9/2015 | Fattal et al. | |
| 9,201,270 B2 | 12/2015 | Fattal et al. | |
| 9,298,168 B2 | 3/2016 | Taff et al. | |
| 9,389,415 B2 | 7/2016 | Fattal et al. | |

(Continued)

FOREIGN PATENT DOCUMENTS

| | | |
|---|---|---|
| EP | 0787316 A1 | 8/1997 |
| JP | 2007027134 A | 2/2007 |

(Continued)

OTHER PUBLICATIONS

International Search Report and Written Opinion (ISRWO) from the International Searching Authority (ISA/KR) dated Sep. 18, 2018 (13 pages) for counterpart parent PCT Application No. PCT/US2018/015617.

(Continued)

*Primary Examiner* — Bryon T Gyllstrom
(74) *Attorney, Agent, or Firm* — J. Michael Johnson

(57) ABSTRACT

A polarization recycling backlight and a multiview display employ a polarization-selective scattering feature configured to preferentially scatter out a first polarization component of guided light and a polarization conversion structure configured to convert a portion of a second polarization component of the guided light into the first polarization component. The polarization conversion structure includes a subwavelength grating.

20 Claims, 10 Drawing Sheets

(56) References Cited

U.S. PATENT DOCUMENTS

| | | | |
|---|---|---|---|
| 9,459,461 | B2 | 10/2016 | Santori et al. |
| 9,557,466 | B2 | 1/2017 | Fattal |
| 9,568,661 | B2 * | 2/2017 | Ohno .................. G02B 6/0001 |
| 9,785,119 | B2 | 10/2017 | Taff et al. |
| 10,551,546 | B2 | 2/2020 | Fattal |
| 10,649,128 | B2 | 5/2020 | Fattal et al. |
| 10,810,917 | B2 * | 10/2020 | Fattal ................ G02F 1/133606 |
| 2002/0015314 | A1 | 2/2002 | Umemoto et al. |
| 2002/0176165 | A1 | 11/2002 | Lee et al. |
| 2004/0051927 | A1 | 3/2004 | Tsai et al. |
| 2004/0130882 | A1 * | 7/2004 | Hara .................... G02B 6/0031 362/609 |
| 2004/0141108 | A1 | 7/2004 | Tanaka et al. |
| 2005/0002611 | A1 | 1/2005 | Levola |
| 2006/0087860 | A1 * | 4/2006 | Ishida ................. F21S 41/155 362/517 |
| 2006/0204865 | A1 | 9/2006 | Erchak et al. |
| 2006/0256578 | A1 * | 11/2006 | Yang ................ G02F 1/133615 362/609 |
| 2006/0285347 | A1 * | 12/2006 | Okada .................. F21S 41/321 362/516 |
| 2008/0260328 | A1 * | 10/2008 | Epstein ................ G02B 6/0028 385/32 |
| 2008/0297696 | A1 | 12/2008 | Banerjee |
| 2009/0040608 | A1 | 2/2009 | Tsai et al. |
| 2010/0165598 | A1 | 7/2010 | Chen et al. |
| 2011/0141395 | A1 | 6/2011 | Yashiro |
| 2013/0155723 | A1 * | 6/2013 | Coleman .............. G02B 6/0028 362/621 |
| 2015/0036068 | A1 * | 2/2015 | Fattal .................... G02B 6/005 349/15 |
| 2015/0205034 | A1 | 7/2015 | Facke et al. |
| 2016/0091752 | A1 | 3/2016 | Lien et al. |
| 2016/0091775 | A1 | 3/2016 | Gibson et al. |
| 2016/0154291 | A1 | 6/2016 | Gibson et al. |
| 2016/0231566 | A1 | 8/2016 | Levola et al. |
| 2016/0259167 | A1 | 9/2016 | Takagi et al. |
| 2017/0299799 | A1 | 10/2017 | Fattal |
| 2017/0329149 | A1 | 11/2017 | Fattal |
| 2017/0363794 | A1 | 12/2017 | Wan |
| 2018/0024289 | A1 | 1/2018 | Fattal |
| 2018/0156963 | A1 | 6/2018 | Fattal |
| 2018/0188691 | A1 | 7/2018 | Fattal |
| 2019/0018186 | A1 | 1/2019 | Fattal |
| 2019/0155105 | A1 | 5/2019 | Aieta et al. |
| 2020/0005718 | A1 | 1/2020 | Fattal |
| 2020/0018886 | A1 | 1/2020 | Fattal et al. |
| 2020/0018891 | A1 | 1/2020 | Fattal et al. |

FOREIGN PATENT DOCUMENTS

| | | |
|---|---|---|
| WO | 2008091585 A | 7/2008 |
| WO | 2012038856 A | 3/2012 |
| WO | 2019125390 A1 | 6/2019 |
| WO | 2019125479 A1 | 6/2019 |

OTHER PUBLICATIONS

Fattal, David et al., "A multi-directional backlight for a wide-angle, glasses-free three-dimensional display," Nature, Mar. 21, 2013, pp. 348-351, vol. 495, Macmillan Publishers Limited, 2013.

Reichelt et al.,"Holographic 3-D Displays—Electro-holography within the Grasp of Commercialization," Advances in Lasers and Electro-Optics, Optics, Nelson Costa and Adolfo Cartaxo (Ed.), (2010), pp. 683-711, ISBN: 978-953-307-088-9, InTech, Available from: http://www.intechopen.com/books/advances-in-lasers-and-electro-optics/holographic-3-ddisplays-electro-holography-within-the-grasp-of-commercialization.

Travis et al., "Collimated light from a waveguide for a display backlight," Optics Express, Oct. 2009, pp. 19714-19719, vol. 17, No. 22.

Xu et al., "Computer-Generated Holography for Dynamic Display of 3D Objects with Full Parallax," International Journal of Virtual Reality, 2009, pp. 33-38, vol. 8, No. 2.

Son, Jung-Young et al., "Three-Dimensional Imaging Methods Based on Multiview Images," IEEE/OSA Journal of Display Technology, Sep. 2005, pp. 125-140, vol. 1, No. 1.

Kee, Edwin., "Hitachi Full Parallax 3D Display Offers Mind Bending Visuals," http://www.ubergizmo.com/2011/10/hitachi-full-parallax-3d-display-offers-mind-bending-visuals, Oct. 4, 2011, 2 pages.

* cited by examiner

POLARIZATION RECYCLING BACKLIGHT, METHOD AND MULTIVIEW DISPLAY EMPLOYING SUBWAVELENGTH GRATINGS

CROSS-REFERENCE TO RELATED APPLICATIONS

This application is a continuation application of and claims priority to International Patent Application No. PCT/US2018/015617, filed Jan. 27, 2018, which is incorporated by reference in its entirety herein.

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Most commonly employed electronic displays include the cathode ray tube (CRT), plasma display panels (PDP), liquid crystal displays (LCD), electroluminescent displays (EL), organic light emitting diode (OLED) and active matrix OLEDs (AMOLED) displays, electrophoretic displays (EP) and various displays that employ electromechanical or electrofluidic light modulation (e.g., digital micromirror devices, electrowetting displays, etc.). Generally, electronic displays may be categorized as either active displays (i.e., displays that emit light) or passive displays (i.e., displays that modulate light provided by another source). Among the most obvious examples of active displays are CRTs, PDPs and OLEDs/AMOLEDs. Displays that are typically classified as passive when considering emitted light are LCDs and EP displays. Passive displays, while often exhibiting attractive performance characteristics including, but not limited to, inherently low power consumption, may find somewhat limited use in many practical applications given the lack of an ability to emit light.

To overcome the limitations of passive displays associated with emitted light, many passive displays are coupled to an external light source. The coupled light source may allow these otherwise passive displays to emit light and function substantially as active displays. Examples of such coupled light sources are backlights. A backlight may serve as a source of light (often a panel backlight) that is placed behind an otherwise passive display to illuminate the passive display. For example, a backlight may be coupled to an LCD or an EP display. The backlight emits light that passes through the LCD or the EP display. The light emitted is modulated by the LCD or the EP display and the modulated light is then emitted, in turn, from the LCD or the EP display. Often backlights are configured to emit white light. Color filters are then used to transform the white light into various colors used in the display. The color filters may be placed at an output of the LCD or the EP display (less common) or between the backlight and the LCD or the EP display, for example. Alternatively, the various colors may be implemented by field-sequential illumination of a display using different colors, such as primary colors.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Figure 1A:
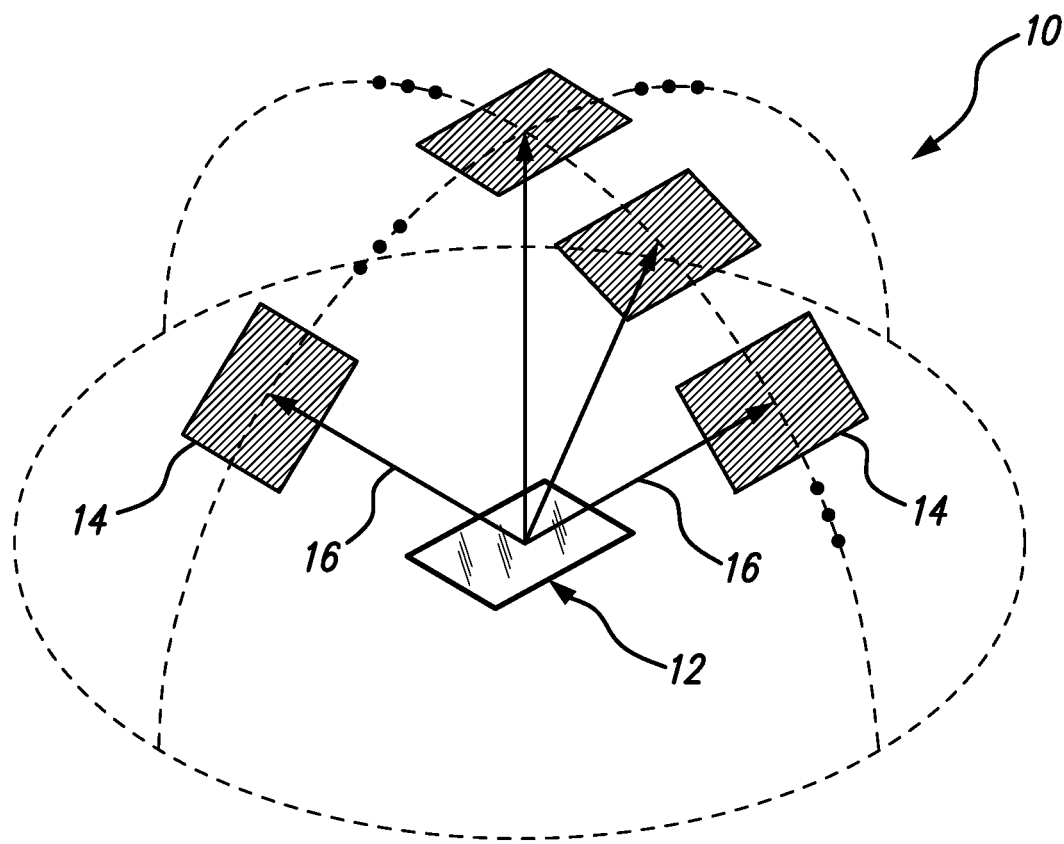
FIG. 1A illustrates a perspective view of a multiview display in an example, according to an embodiment consistent with the principles described herein.

Certain examples and embodiments have other features that are one of in addition to and in lieu of the features illustrated in the above-referenced figures. These and other features are detailed below with reference to the above-referenced figures.

DETAILED DESCRIPTION

Examples and embodiments in accordance with the principles described herein provide backlighting employing polarization-selective scattering and polarization conversion with application to electronic displays. In various embodiments consistent with the principles described herein, a backlight employing a polarization-selective scattering feature is provided. The polarization-selective scattering feature selectively scatters out a polarized portion of light. A polarization conversion structure comprising a subwavelength grating is also provided. The polarization conversion structure converts a polarization of the guided light into a polarization corresponding to the polarized portion of light that is selectively scattered by the polarization-selective scattering feature. By converting the polarization of the guided light into the polarization that is selectively scattered, the polarization conversion structure may increase an amount of polarized light available for selective scattering by the polarization-selective scatterer and therefore may increase an intensity of light emitted by the backlight, according to some embodiments.

Herein a 'two-dimensional display' or '2D display' is defined as a display configured to provide a view of an image that is substantially the same regardless of a direction from which the image is viewed (i.e., within a predefined viewing angle or range of the 2D display). A liquid crystal display (LCD) found in may smart phones and computer monitors are examples of 2D displays. In contrast herein, a 'multiview display' is defined as an electronic display or display system configured to provide different views of a multiview image in or from different view directions. In particular, the different views may represent different perspective views of a scene or object of the multiview image. In some instances, a multiview display may also be referred to as a three-dimensional (3D) display, e.g., when simultaneously viewing two different views of the multiview image provides a perception of viewing a three dimensional image.

Herein, a 'light guide' is defined as a structure that guides light within the structure using total internal reflection. In particular, the light guide may include a core that is substantially transparent at an operational wavelength of the light guide. The term 'light guide' generally refers to a dielectric optical waveguide that employs total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some embodiments, the light guide may include a coating in addition to or instead of the aforementioned refractive index difference to further facilitate the total internal reflection. The coating may be a reflective coating, for example. The light guide may be any of several light guides including, but not limited to, one or both of a plate or slab guide and a strip guide.

Herein, a 'polarization-selective scattering feature' is generally defined as a feature configured to selectively scatter incident light having a particular polarization. In some embodiments, incident light may comprise a first polarization component or simply 'first polarization' and a second polarization component or simply 'second polarization'. For example, the first polarization component may be a transverse electric (TE) polarization component, while the second polarization component may be a transverse magnetic (TM) polarization component. In another example, the first polarization component may be a TM polarization component and the second polarization component may be a TE polarization component.

According to various embodiments, the polarization-selective scattering feature may be configured to preferentially scatter out light associated with the first polarization (e.g., having a first polarization). Further, light associated with the second polarization component (e.g., having a second polarization) may be either not scattered or minimally scattered by the polarization-selective scattering feature, according to various embodiments. In some embodiments, the polarization-selective scattering feature may be optically coupled to a light guide to selectively scatter guided light of the first polarization from within the light guide. In particular, the polarization-selective scattering feature is located on a surface of the light guide, according to some embodiments.

Herein, a 'polarization conversion structure' is generally defined as a structure configured to convert a portion of a polarization component of light incident on the structure into another polarization component. For example, the polarization conversion structure may convert a portion of the second polarization component of light incident on the structure into the first polarization component. The polarization conversion structure may therefore receive light comprising a TM polarization component, convert a portion of the TM polarization component into a TE polarization component, and then provide as an output light comprising the resulting TE polarization component. In some embodiments, the polarization conversion structure may employ phase retardation between the first and the second polarization components. In particular, the polarization conversion structure may introduce a phase delay between the first and the second polarization components sufficient to transform a portion of the second polarization component into the first polarization component. In various embodiments, the polarization conversion structure comprises a diffraction grating, and specifically, a subwavelength diffraction grating, as will be described further below.

By definition herein, a 'multibeam element' is a structure or element of a backlight or a display that produces light that includes a plurality of directional light beams. Directional light beams of the plurality of directional light beams (or 'directional light beam plurality') produced by a multibeam element have different principal angular directions from one another, by definition herein. In particular, by definition, a directional light beam of the directional light beam plurality has a predetermined principal angular direction that is different from another directional light beam of the directional light beam plurality. According to some embodiments, a size of the multibeam element may be comparable to a size of a light valve used in a display that is associated with the multibeam element (e.g., a multiview display). In particular, the multibeam element size may be between about one half and about two times the light valve size, in some embodiments. In some embodiments, a multibeam element may provide polarization-selective scattering.

According to various embodiments, the directional light beam plurality may represent a light field. For example, the directional light beam plurality may be confined to a substantially conical region of space or have a predetermined angular spread that includes the different principal angular directions of the light beams in the light beam plurality. As such, the predetermined angular spread of the directional light beams in combination (i.e., the directional light beam plurality) may represent the light field.

According to various embodiments, the different principal angular directions of the various directional light beams in the directional light beam plurality are determined by a characteristic including, but not limited to, a size (e.g., one or more of length, width, area, and etc.) of the multibeam element along with other characteristics. For example, in a diffractive multibeam element, a 'grating pitch' or a diffractive feature spacing and an orientation of a diffraction grating within diffractive multibeam element may be characteristics that determine, at least in part, the different principal angular directions of the various directional light beams. In some embodiments, the multibeam element may be considered an 'extended point light source', i.e., a plurality of point light sources distributed across an extent of the multibeam element, by definition herein. Further, a directional light beam produced by the multibeam element may have a principal angular direction given by angular components $\{\theta, \varphi\}$, as described below with respect to FIG. 1B.

Herein, a 'multiview display' is defined as an electronic display or display system configured to provide different views of a multiview image in different view directions. FIG. 1A illustrates a perspective view of a multiview display 10 in an example, according to an embodiment consistent with the principles described herein. As illustrated in FIG. 1A, the multiview display 10 comprises a screen 12 to display a multiview image to be viewed. The multiview display 10 provides different views 14 of the multiview image in different view directions 16 relative to the screen 12. The view directions 16 are illustrated as arrows extending from the screen 12 in various different principal angular directions; the different views 14 are illustrated as shaded polygonal boxes at the termination of the arrows (i.e., depicting the view directions 16); and only four views 14 and four view directions 16 are illustrated, all by way of example and not limitation. Note that while the different views 14 are illustrated in FIG. 1A as being above the screen, the views 14 actually appear on or in a vicinity of the screen 12 when the multiview image is displayed on the multiview display 10. Depicting the views 14 above the screen 12 is only for simplicity of illustration and is meant to represent viewing the multiview display 10 from a respective one of the view directions 16 corresponding to a particular view 14.

A view direction or equivalently a light beam having a direction corresponding to a view direction of a multiview display generally has a principal angular direction given by angular components $\{\theta, \varphi\}$, by definition herein. The angular component $\theta$ is referred to herein as the 'elevation component' or 'elevation angle' of the light beam. The angular component $\varphi$ is referred to as the 'azimuth component' or 'azimuth angle' of the light beam. By definition, the elevation angle $\theta$ is an angle in a vertical plane (e.g., perpendicular to a plane of the multiview display screen while the azimuth angle $\varphi$ is an angle in a horizontal plane (e.g., parallel to the multiview display screen plane).

Figure 1B:
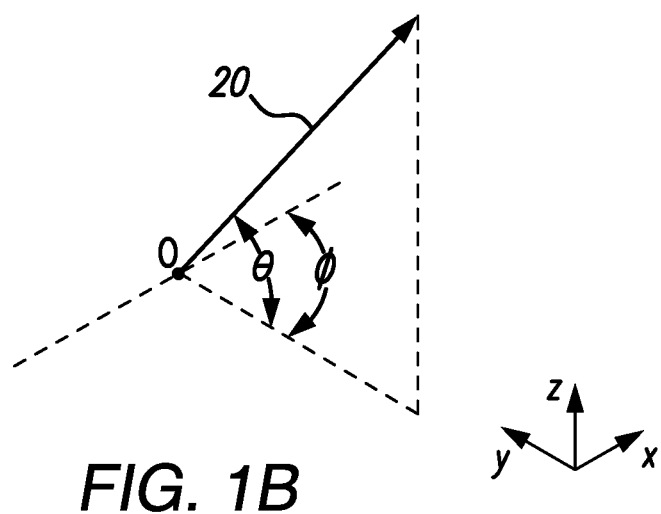
FIG. 1B illustrates a graphical representation of angular components of a light beam having a particular principal angular direction corresponding to a view direction of a multiview display in an example, according to an embodiment consistent with the principles described herein.

FIG. 1B illustrates a graphical representation of the angular components $\{\theta, \varphi\}$ of a light beam 20 having a particular principal angular direction corresponding to a view direction (e.g., view direction 16 in FIG. 1A) of a multiview display in an example, according to an embodiment consistent with the principles described herein. In addition, the light beam 20 is emitted or emanates from a particular point, by definition herein. That is, by definition, the light beam 20 has a central ray associated with a particular point of origin within the multiview display. FIG. 1B also illustrates the light beam (or view direction) point of origin O.

Further herein, the term 'multiview' as used in the terms 'multiview image' and 'multiview display' is defined as a plurality of views representing different perspectives or including angular disparity between views of the view plurality. In addition, herein the term 'multiview' explicitly includes more than two different views (i.e., a minimum of three views and generally more than three views), by definition herein. As such, 'multiview display' as employed herein is explicitly distinguished from a stereoscopic display that includes only two different views to represent a scene or an image. Note however, while multiview images and multiview displays include more than two views, by definition herein, multiview images may be viewed (e.g., on a multiview display) as a stereoscopic pair of images by selecting only two of the multiview views to view at a time (e.g., one view per eye).

Herein, a 'diffraction grating' is generally defined as a plurality of features (i.e., diffractive features) arranged or configured to provide diffraction of light incident on the diffraction grating. In some examples, the plurality of features may be arranged in a periodic or quasi-periodic manner. For example, the diffraction grating may include a plurality of features (e.g., a plurality of grooves or ridges in a material surface) arranged in a one-dimensional (1D) array. In other examples, the diffraction grating may be a two-dimensional (2D) array of features. The diffraction grating may be a 2D array of bumps on or holes in a material surface, for example.

As such, and by definition herein, the diffraction grating is a structure that provides diffraction of light incident on the diffraction grating. If the light is incident on the diffraction grating from a light guide, the provided diffraction or diffractive scattering may result in, and thus be referred to as, 'diffractive coupling' in that the diffraction grating may couple light out of the light guide by diffraction. The diffraction grating also redirects or changes an angle of the light by diffraction (i.e., at a diffractive angle). In particular, as a result of diffraction, light leaving the diffraction grating generally has a different propagation direction than a propagation direction of the light incident on the diffraction grating (i.e., incident light). The change in the propagation direction of the light by diffraction is referred to as 'diffractive redirection' herein. Hence, the diffraction grating may be understood to be a structure including diffractive features that diffractively redirects light incident on the diffraction grating and, if the light is incident from a light guide, the diffraction grating may also diffractively couple out the light from the light guide.

Further, by definition herein, the features of a diffraction grating are referred to as 'diffractive features' and may be one or more of at, in and on a material surface (i.e., a boundary between two materials). The surface may be a surface of a light guide, for example. The diffractive features may include any of a variety of structures that diffract light including, but not limited to, one or more of grooves, ridges, holes and bumps at, in or on the surface. For example, the diffraction grating may include a plurality of substantially parallel grooves in the material surface. In another example, the diffraction grating may include a plurality of parallel ridges rising out of the material surface. The diffractive features (e.g., grooves, ridges, holes, bumps, etc.) may have any of a variety of cross sectional shapes or profiles that provide diffraction including, but not limited to, one or more of a sinusoidal profile, a rectangular profile (e.g., a binary diffraction grating), a triangular profile and a saw tooth profile (e.g., a blazed grating).

According to various examples described herein, a diffraction grating (e.g., a diffraction grating of a multibeam element, as described below) may be employed to diffractively scatter or couple light out of a light guide (e.g., a plate light guide) as a light beam. In particular, a diffraction angle $\theta_m$ of or provided by a locally periodic diffraction grating may be given by equation (1) as:

$$\theta_m = \sin^{-1}\left(n \sin\theta_i - \frac{m\lambda}{d}\right) \quad (1)$$

where λ is a wavelength of the light, m is a diffraction order, n is an index of refraction of a light guide, d is a distance or spacing between features of the diffraction grating, $\theta_i$ is an angle of incidence of light on the diffraction grating. For simplicity, equation (1) assumes that the diffraction grating is adjacent to a surface of the light guide and a refractive index of a material outside of the light guide is equal to one (i.e., $n_{out}=1$). In general, the diffraction order m is given by an integer. A diffraction angle $\theta_m$ of a light beam produced by the diffraction grating may be given by equation (1) where the diffraction order is positive (e.g., m>0). For example, first-order diffraction is provided when the diffraction order m is equal to one (i.e., m=1).

Figure 2:
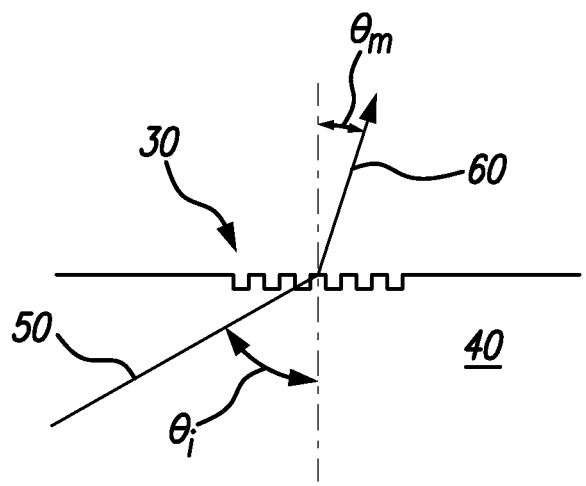
FIG. 2 illustrates a cross sectional view of a diffraction grating in an example, according to an embodiment consistent with the principles described herein.

FIG. 2 illustrates a cross sectional view of a diffraction grating 30 in an example, according to an embodiment consistent with the principles described herein. For example, the diffraction grating 30 may be located on a surface of a light guide 40. In addition, FIG. 2 illustrates a light beam 50 incident on the diffraction grating 30 at an incident angle $\theta_i$. The light beam 50 is a guided light beam within the light guide 40. Also illustrated in FIG. 2 is a directional light beam 60 diffractively produced and coupled-out by the diffraction grating 30 as a result of diffraction of the incident light beam 50. The directional light beam 60 has a diffraction angle $\theta_m$ (or 'principal angular direction' herein) as given by equation (1). The diffraction angle $\theta_m$ may correspond to a diffraction order 'm' of the diffraction grating 30, for example.

Herein, a 'light source' is defined as a source of light (e.g., an optical emitter configured to produce and emit light). For example, the light source may comprise an optical emitter such as a light emitting diode (LED) that emits light when activated or turned on. In particular, herein the light source may be substantially any source of light or comprise substantially any optical emitter including, but not limited to, one or more of a light emitting diode (LED), a laser, an organic light emitting diode (OLED), a polymer light emitting diode, a plasma-based optical emitter, a fluorescent lamp, an incandescent lamp, and virtually any other source of light. The light produced by the light source may have a color (i.e., may include a particular wavelength of light), or may be a range of wavelengths (e.g., white light). In some embodiments, the light source may comprise a plurality of optical emitters. For example, the light source may include a set or group of optical emitters in which at least one of the optical emitters produces light having a color, or equivalently a wavelength, that differs from a color or wavelength of light produced by at least one other optical emitter of the set or group. The different colors may include primary colors (e.g., red, green, blue) for example.

By definition, 'broad-angle' emitted light is defined as light having a cone angle that is greater than a cone angle of the view of a multiview image or multiview display. In particular, in some embodiments, the broad-angle emitted light may have a cone angle that is greater than about twenty degrees (e.g., >±20°). In other embodiments, the broad-angle emitted light cone angle may be greater than about thirty degrees (e.g., >±30°), or greater than about forty degrees (e.g., >±40°), or greater than about fifty degrees (e.g., >±50°). For example, the cone angle of the broad-angle emitted light may be about sixty degrees (e.g., ±60°).

In some embodiments, the broad-angle emitted light cone angle may defined to be about the same as a viewing angle of an LCD computer monitor, an LCD tablet, an LCD television, or a similar digital display device meant for broad-angle viewing (e.g., about ±40-65°). In other embodiments, broad-angle emitted light may also be characterized or described as diffuse light, substantially diffuse light, non-directional light (i.e., lacking any specific or defined directionality), or as light having a single or substantially uniform direction.

Further, as used herein, the article 'a' is intended to have its ordinary meaning in the patent arts, namely 'one or more'. For example, 'a subwavelength grating' means one or more a subwavelength gratings and as such, 'the subwavelength grating' means 'subwavelength grating(s)' herein. Also, any reference herein to 'top', 'bottom', 'upper', 'lower', 'up', 'down', 'front', back', 'first', 'second', 'left' or 'right' is not intended to be a limitation herein. Herein, the term 'about' when applied to a value generally means within the tolerance range of the equipment used to produce the value, or may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

Figure 3A:
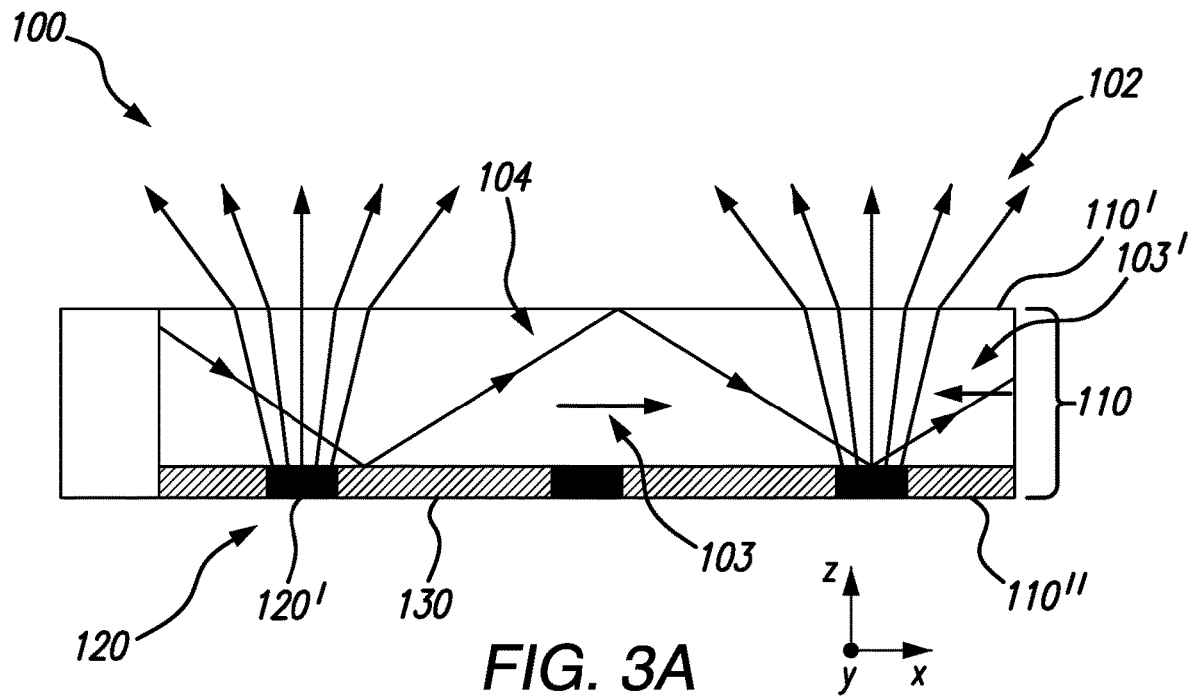
FIG. 3A illustrates a cross sectional view of a polarization recycling backlight in an example, according to an embodiment consistent with the principles described herein.
Figure 3B:
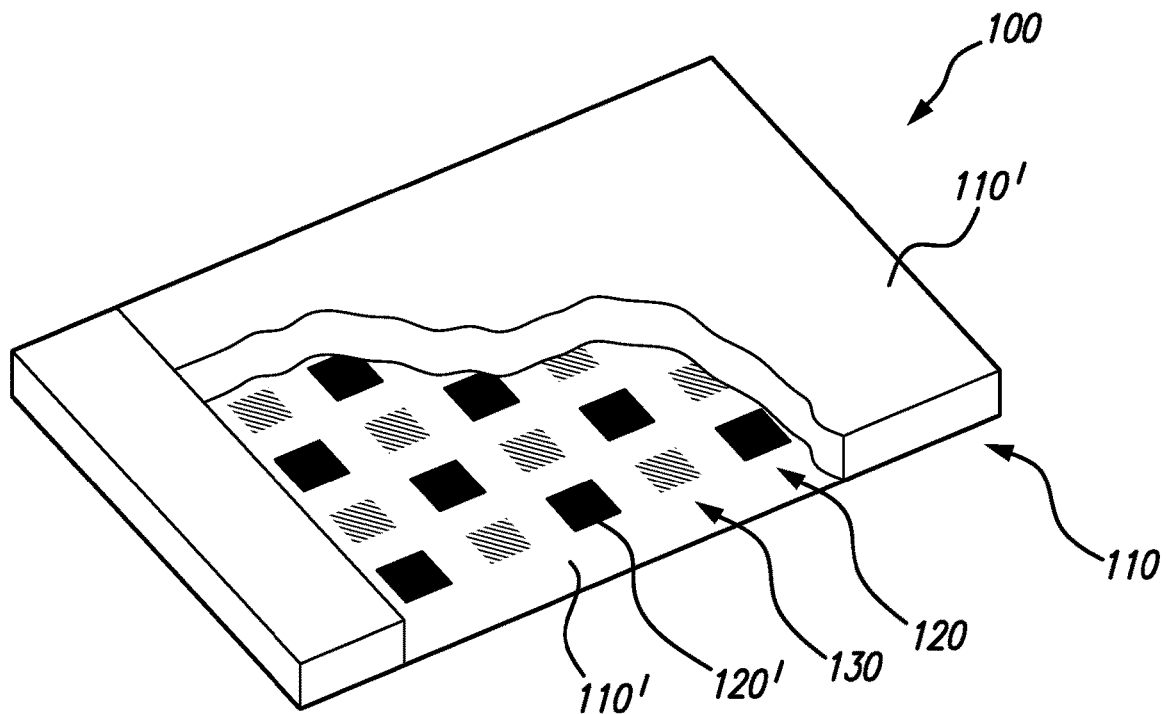
FIG. 3B illustrates a perspective view of a polarization recycling backlight in an example, according to an embodiment consistent with the principles described herein.
Figure 3C:
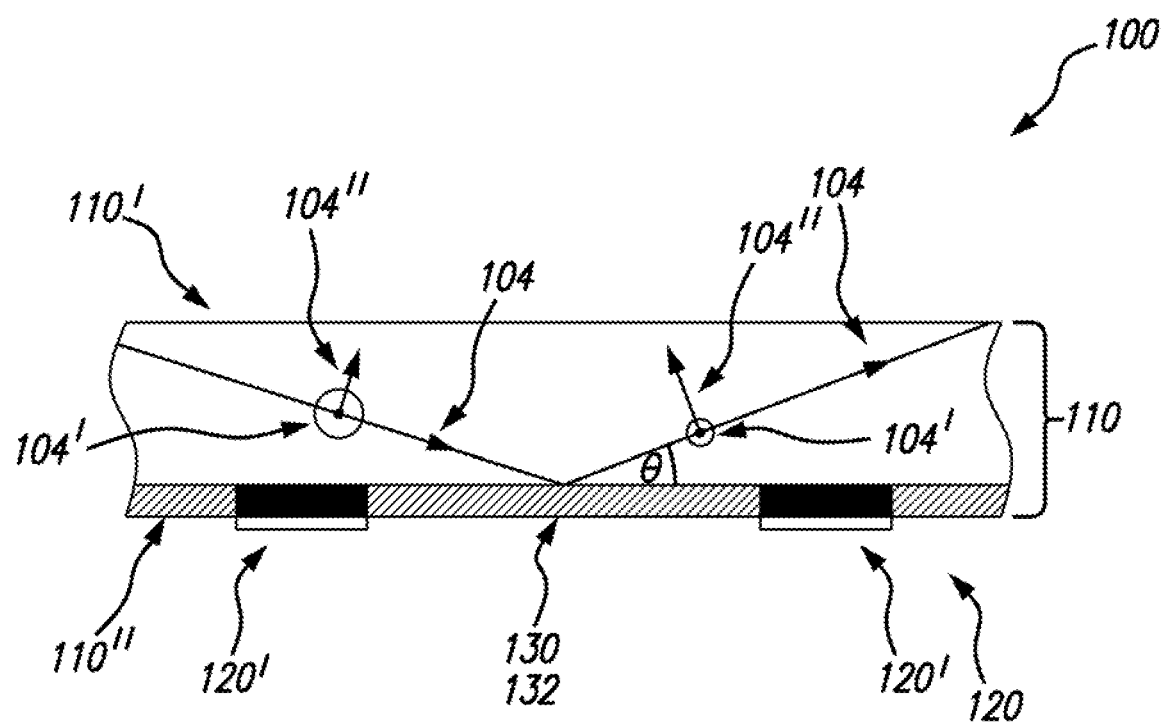
FIG. 3C illustrates a cross sectional view of a portion of a polarization recycling backlight including a diffractive multibeam element and a polarization conversion structure in an example, according to an embodiment consistent with the principles described herein.

According to some embodiments of the principles described herein, a backlight is provided. FIG. 3A illustrates a cross-sectional view of a polarization recycling backlight 100 in an example, according to an embodiment consistent with the principles described herein. FIG. 3B illustrates a perspective view of a polarization recycling backlight 100 in an example, according to an embodiment consistent with the principles described herein. FIG. 3C illustrates a cross-sectional view of a portion of a polarization recycling backlight 100 in an example, according to an embodiment consistent with the principles described herein. The illustrated polarization recycling backlight 100 may be used for backlighting in an electronic display including, but not limited to, a multiview display, for example.

According to various embodiments, the polarization recycling backlight 100 is configured to provide or emit light as emitted light 102. In some embodiments, the emitted light 102 may be or comprise broad-angle emitted light. The broad-angle emitted light may be suitable for use as an illumination source in 2D display applications, for example. In other embodiments, the emitted light 102 may be directional emitted light comprising a plurality of directional light beams. For example, the plurality of directional light beams may have directions corresponding to view directions of a multiview image and the emitted light 102 may be used as an illumination source for the multiview display configured to display the multiview image.

Further, polarization recycling backlight 100 may be configured to provide the emitted light 102 from or using a particular polarization component of light guided within the polarization recycling backlight 100 as guided light 104. For example, the emitted light 102 may be provided from or at least substantially provided from a first polarization component of the guided light 104. As a result, an available amount of the first polarization may diminish as a result of providing the emitted light 102. The polarization recycling backlight 100 is further configured to convert a polarization a portion of the guided light 104 other than the particular polarization into the particular polarization component to replenish that polarization component. For example, the polarization recycling backlight 100 may convert a second polarization component into the first polarization component to replenish the first polarization component of the guided light 104. As such, the polarization recycling backlight 100 is configured to recycle a polarization component of the guided light 104 to provide additional guided light of the particular polarization component used to provide the emitted light 102, according to various embodiments.

As illustrated in FIGS. 3A-3C, the polarization recycling backlight 100 comprises a light guide 110. The light guide 110 is configured to guide light along a length of the light guide 110 as guided light 104 (i.e., a guided light beam 104). For example, the light guide 110 may include a dielectric material configured as an optical waveguide. The dielectric material may have a first refractive index that is greater than a second refractive index of a medium surrounding the dielectric optical waveguide. The difference in refractive indices is configured to facilitate total internal reflection of the guided light 104 according to one or more guided modes of the light guide 110, for example.

In some embodiments, the light guide 110 may be a slab or plate optical waveguide (i.e., a plate light guide) comprising an extended, substantially planar sheet of optically transparent, dielectric material. The substantially planar sheet of dielectric material is configured to guide the guided light 104 using total internal reflection. According to various examples, the optically transparent material of the light guide 110 may include or be made up of any of a variety of dielectric materials including, but not limited to, one or more of various types of glass (e.g., silica glass, alkali-aluminosilicate glass, borosilicate glass, etc.) and substantially optically transparent plastics or polymers (e.g., poly(methyl methacrylate) or 'acrylic glass', polycarbonate, etc.). In some examples, the light guide 110 may further include a cladding layer (not illustrated) on at least a portion of a surface (e.g., one or both of the first surface and the second surface) of the light guide 110. The cladding layer may be used to further facilitate total internal reflection, according to some examples.

Further, according to some embodiments, the light guide 110 is configured to guide the guided light 104 according to total internal reflection at a non-zero propagation angle between a first surface 110' (e.g., front or top surface or side) and a second surface 110" (e.g., back or bottom surface or side) of the light guide 110. In particular, the guided light 104 propagates by reflecting or 'bouncing' between the first surface 110' and the second surface 110" of the light guide 110 at the non-zero propagation angle. In some embodiments, a plurality of guided light beams 104 comprising different colors of light may be guided by the light guide 110 at respective ones of different color-specific, non-zero propagation angles. Note, the non-zero propagation angle is not illustrated in FIG. 3B for simplicity of illustration. However, a bold arrow depicting a propagation direction 103 illustrates a general propagation direction of the guided light 104 along the light guide length in FIG. 3A.

As defined herein, a 'non-zero propagation angle' is an angle relative to a surface (e.g., the first surface 110' or the second surface 110") of the light guide 110. Further, the non-zero propagation angle is both greater than zero and less than a critical angle of total internal reflection within the light guide 110, according to various embodiments. For example, the non-zero propagation angle of the guided light 104 may be between about ten (10) and about fifty (50) degrees or, in some examples, between about twenty (20) degrees and about forty (40) degrees, or between about twenty-five (25) degrees and about thirty-five (35) degrees.

For example, the non-zero propagation angle may be about thirty (30) degrees. In other examples, the non-zero propagation angle may be about 20 degrees, or about 25 degrees, or about 35 degrees. Moreover, a specific non-zero propagation angle may be chosen (e.g., arbitrarily) for a particular implementation as long as the specific non-zero propagation angle is chosen to be less than the critical angle of total internal reflection within the light guide 110.

The guided light 104 in the light guide 110 may be introduced or coupled into the light guide 110 at the non-zero propagation angle (e.g., about 30-35 degrees). In some examples, a coupling structure such as, but not limited to, a lens, a mirror or similar reflector (e.g., a tilted collimating reflector), a diffraction grating and a prism (not illustrated) as well as various combinations thereof may facilitate coupling light into an input end of the light guide 110 as the guided light 104 at the non-zero propagation angle. In other examples, light may be introduced directly into the input end of the light guide 110 either without or substantially without the use of a coupling structure (i.e., direct or 'butt' coupling may be employed). Once coupled into the light guide 110, the guided light 104 is configured to propagate along the light guide 110 in a propagation direction 103 that may be generally away from the input end (e.g., illustrated by bold arrows pointing along an x-axis in FIG. 3A).

Further, the guided light 104, or equivalently the guided light beam 104, produced by coupling light into the light guide 110 may be a collimated light beam, according to various embodiments. Herein, a 'collimated light' or a 'collimated light beam' is generally defined as a beam of light in which rays of the light beam are substantially parallel to one another within the light beam (e.g., the guided light beam 104). Further, rays of light that diverge or are scattered from the collimated light beam are not considered to be part of the collimated light beam, by definition herein. In some embodiments, the polarization recycling backlight 100 may include a collimator, such as a lens, reflector or mirror, as described above, (e.g., tilted collimating reflector) to collimate the light, e.g., from a light source. In some embodiments, the light source comprises a collimator (not illustrated). The collimated light provided to the light guide 110 is a collimated guided light 104. The guided light 104 may be collimated according to or having a collimation factor σ, in various embodiments.

In some embodiments, the light guide 110 may be configured to redirect and reuse the guided light 104. In particular, the guided light 104 that has been guided along the light guide length may be redirected back along that length in another propagation direction 103' that differs from the propagation direction 103. For example, the light guide 110 may include a reflector (not illustrated) at an end of the light guide 110 opposite to an input end adjacent to the light source. The reflector may be configured to reflect the guided light 104 back toward the input end as redirected guided light. In some embodiments, another light source may provide guided light 104 in the other propagation direction 103' instead of or in addition to light redirection (e.g., using a reflector). One or both of redirecting and reusing the guided light 104 and using another light source to provide guided light 104 having the other propagation direction 103' may increase a brightness of the polarization recycling backlight 100 (e.g., increase an intensity of the emitted light 102) by making guided light 104 available more than once, for example, to one or both of a polarization-selective scattering feature and a polarization conversion structure, described below. In addition, the guided light 104 may be redirected multiple times by reflecting the guided light 104 at both ends of the light guide 110, for example.

In FIG. 3A, a bold arrow indicating a propagation direction 103' of recycled guided light (e.g., directed in a negative x-direction) illustrates a general propagation direction of the recycled guided light within the light guide 110. Alternatively (e.g., as opposed to recycling guided light), guided light 104 propagating in the other propagation direction 103' may be provided by introducing light into the light guide 110 with the other propagation direction 103' (e.g., in addition to guided light 104 having the propagation direction 103).

In some examples, the guided light 104 may be initially coupled into the light guide 110 as substantially unpolarized, or equivalently 'randomly polarized,' light. The guided light 104 may have a first polarization component and a second polarization component. The first and second polarization components may be substantially orthogonal to one another, according to various examples. In some examples, the first polarization component is a transverse electric (TE) polarization component and the second polarization component is a transverse magnetic (TM) polarization component. The guided light 104 may be represented by a superposition of the two orthogonal polarization components (i.e., the first and the second polarization components), according to some examples.

In some examples, a characteristic (e.g., intensity, quantity, level etc.) of the first portion of the guided light 104 corresponding to or associated with the first polarization component may be about equal to a characteristic (e.g., intensity, etc.) of the second portion of the guided light 104 corresponding to or associated with the second polarization component within the light guide 110, in particular, in a vicinity of the input end of the light guide 110. In other words, light of the substantially unpolarized or arbitrarily polarized guided light 104 at the input end of the light guide 110 may be about equally distributed between the first and second polarization components (e.g., the TE and TM polarization components). In other examples, either the characteristic of the first polarization component portion of the guided light 104 is greater than the second polarization component portion or the characteristic of the second polarization component is greater than the first polarization component portion.

The polarization recycling backlight 100 illustrated in FIGS. 3A-3C further comprises a polarization-selective scattering feature 120. The polarization-selective scattering feature 120 is configured to selectively scatter out a portion of a polarization component of the guided light 104 incident on the polarization-selective scattering feature 120 as the emitted light 102. That is, the polarization-selective scattering feature 120 is configured to scatter out of the light guide a portion of guided light 104 having a particular polarization, e.g., the first polarization component.

In some embodiments, the polarization-selective scattering feature 120 comprises a plurality of polarization-selective scatterers. In particular, individual polarization-selective scatterers of the polarization-selective scattering feature 120 may be discrete structures or features that are spaced apart from one another, each discrete structure being configured to scatter or couple-out a different portion of the guided light 104 in a polarization-selective manner. In various embodiments, the polarization-selective scattering feature 120 may comprise any of variety of different structures or features that provide or are configured to produce polarization-selective scattering including, but not limited to, a diffraction grating, a reflective structure and a refractive structure as well as various combinations thereof having polarization-selective scattering characteristics.

In some embodiments, the polarization-selective scattering feature 120 of the polarization recycling backlight 100 may comprise a multibeam element 120'. In particular, the polarization-selective scattering feature 120 may comprise a plurality of multibeam elements 120', in some embodiments. FIGS. 3A-3C illustrate the polarization-selective scattering feature 120 comprising a plurality of multibeam elements 120', by way of example and not limitation. The polarization recycling backlight 100 with a light guide 110 having an polarization-selective scattering feature 120 comprising the plurality of multibeam elements 120' may be referred to as a 'multiview' backlight, as is further described in more detail below.

According to various embodiments, multibeam elements 120' of the multibeam element plurality may be spaced apart from one another along a length of the light guide 110. In particular, the multibeam elements 120' may be separated from one another by a finite space and represent individual, distinct elements along the light guide length. That is, by definition herein, multibeam elements 120' of the plurality are spaced apart from one another according to a finite (i.e., non-zero) inter-element distance (e.g., a finite center-to-center distance). Further the multibeam elements 120' generally do not intersect, overlap or otherwise touch one another, according to some embodiments. That is, each multibeam element 120' of the multibeam element plurality is generally distinct and separated from other ones of the multibeam elements 120'.

In various embodiments, multibeam elements 120' of the multibeam element plurality may be arranged in a variety of configurations that are one or more of at, on and in the surface (e.g., the first surface 110' or the second surface 110") of the light guide 110. For example, the multibeam elements 120' of the multibeam element plurality may be arranged in columns and rows across the light guide surface (e.g., as an array). In another example, multibeam elements 120' of the multibeam element plurality may be arranged in groups and the groups may be arranged in rows and columns.

According to some embodiments, the plurality of multibeam elements 120' of the polarization-selective scattering feature 120 may be arranged in either a one-dimensional (1D) array or two-dimensional (2D) array. For example, the plurality of multibeam elements 120' may be arranged as a linear 1D array. In another example, the plurality of multibeam elements 120' may be arranged as a rectangular 2D array or as a circular 2D array. Further, the array (i.e., 1D or 2D array) may be a regular or uniform array, in some examples. In particular, an inter-element distance (e.g., center-to-center distance or spacing) between the multibeam elements 120' may be substantially uniform or constant across the array. In other examples, the inter-element distance between the multibeam elements 120' may be varied one or both of across the array and along the length of the light guide 110.

According to various embodiments, a multibeam element 120' of the plurality of multibeam element 120' is configured to couple out a portion of the guided light 104 as the emitted light 102. Further, the emitted light 102 comprises a plurality of directional light beams 102' (and thus may be referred to as directional emitted light). In FIG. 3A, the directional light beams 102' are illustrated as a plurality of diverging arrows depicted as being directed way from the first (or front) surface 110' of the light guide 110. According to various embodiments, the directional light beams 102' have different principal angular directions from one another. Further, the different principal angular directions of the directional light beams 102' may correspond to respective different view directions of a multiview display comprising multiview pixels, according to various embodiments.

According to various embodiments, the multibeam elements 120' may comprise any of a number of different structures configured to couple out a portion of the guided light 104. For example, the different structures may include, but are not limited to, diffraction gratings, micro-reflective elements, micro-refractive elements, or various combinations thereof. In some embodiments, the multibeam element 120' comprising a diffraction grating is configured to diffractively couple out the guided light portion as the plurality of directional light beams 102' having the different principal angular directions. In other embodiments, the multibeam element 120' comprising a micro-reflective element is configured to reflectively couple out the guided light portion as the plurality of directional light beams 102', or the multibeam element 120' comprising a micro-refractive element is configured to couple out the guided light portion as the plurality of directional light beams 102' by or using refraction (i.e., refractively couple out the guided light portion).

Figure 4A:
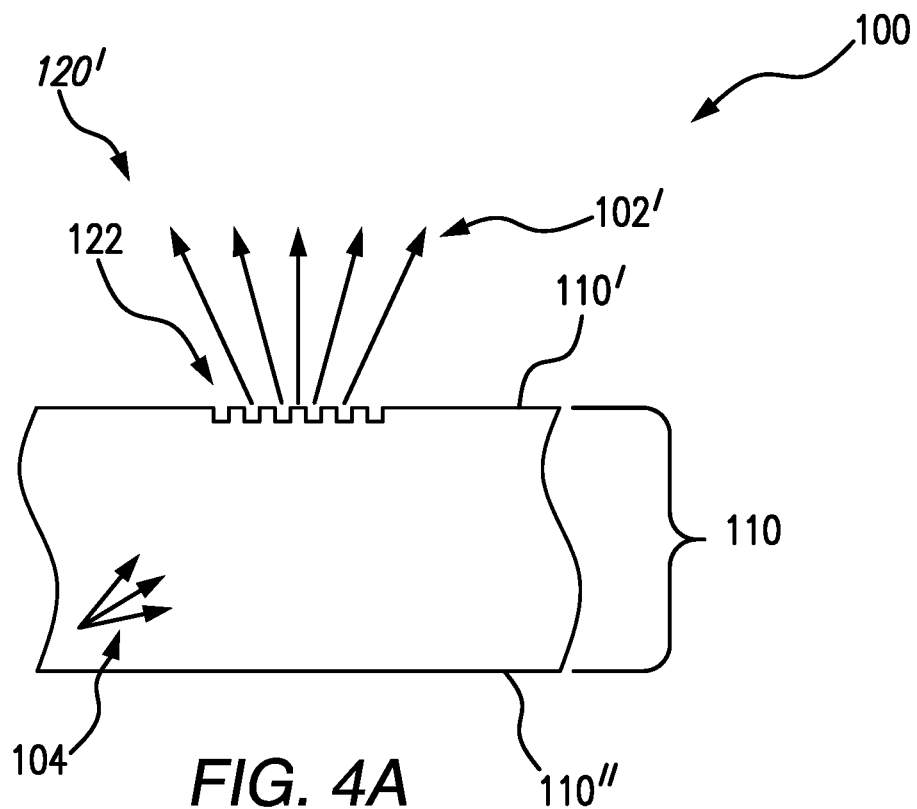
FIG. 4A illustrates a cross sectional view of a portion of a polarization recycling backlight including a diffractive multibeam element in an example, according to an embodiment consistent with the principles described herein.
Figure 4B:
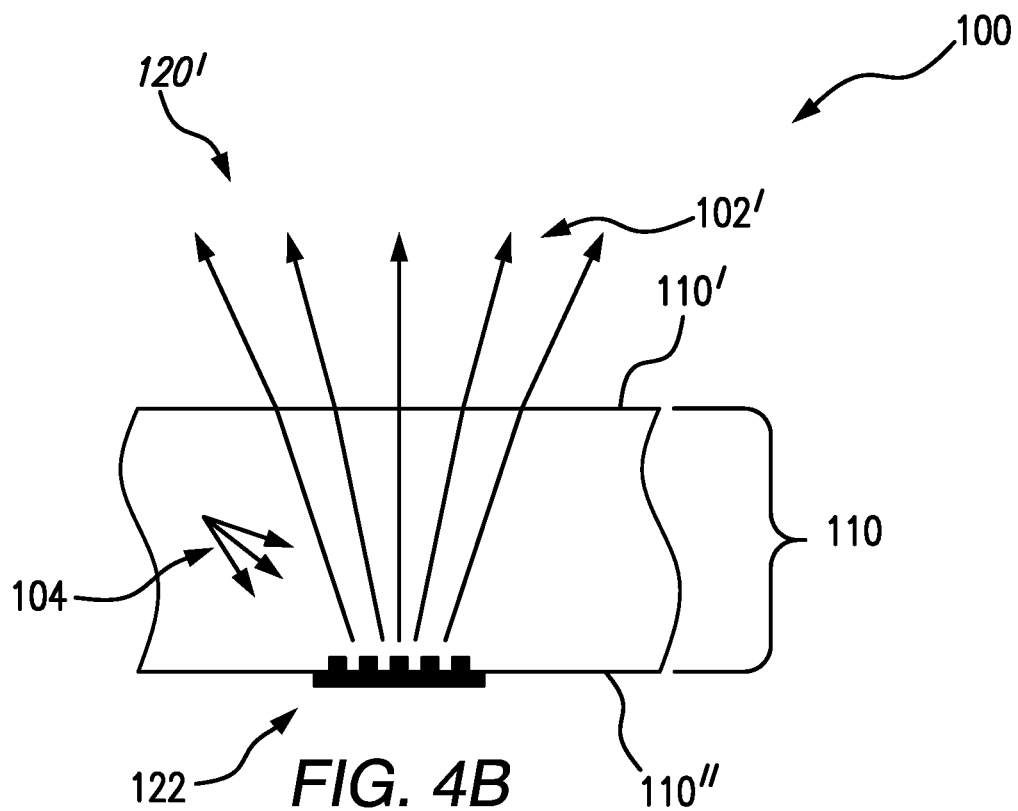
FIG. 4B illustrates a cross sectional view of a portion of a polarization recycling backlight including a diffractive multibeam element in an example, according to another embodiment consistent with the principles described herein.

FIG. 4A illustrates a cross sectional view of a portion of a polarization recycling backlight 100 including a multibeam element 120' in an example, according to an embodiment consistent with the principles described herein. FIG. 4B illustrates a cross sectional view of a portion of a polarization recycling backlight 100 including a multibeam element 120' in an example, according to another embodiment consistent with the principles described herein. In particular, FIGS. 4A-4B illustrate the multibeam element 120' of the polarization recycling backlight 100 as a diffractive multibeam element comprising a diffraction grating 122. The diffraction grating 122 is configured to diffractively couple out a portion of the guided light 104 as the plurality of directional light beams 102' of the emitted light 102. The diffraction grating 122 comprises a plurality of diffractive features spaced apart from one another by a diffractive feature spacing or a diffractive feature or grating pitch configured to provide diffractive coupling out of the guided light portion.

In some embodiments, the diffraction grating 122 of the multibeam element 120' may be located at or adjacent to a surface of the light guide 110. For example, the diffraction grating 122 may be at or adjacent to the first surface 110' of the light guide 110, e.g., as illustrated in FIG. 4A. The diffraction grating 122 at the first surface 110' of the light guide 110 may be a transmission mode diffraction grating configured to diffractively couple out the guided light portion through the first surface 110' as the directional light beams 102'. In other embodiments, e.g., as illustrated in FIG. 4B, the diffraction grating 114 may be located at or adjacent to the second surface 110" of the light guide 110. When located at the second surface 110", the diffraction grating 122 may be a reflection mode diffraction grating. As a reflection mode diffraction grating, the diffraction grating 122 is configured to both diffract the guided light portion and reflect the diffracted guided light portion toward the first surface 110' to exit through the first surface 110' as the directional light beams 102'. In yet other embodiments (not illustrated), the diffraction grating may be located between the surfaces of the light guide 110, e.g., as one or both of a transmission mode diffraction grating and a reflection mode diffraction grating. Note that, in some embodiments described herein, the principal angular directions of the directional light beams 102' may include an effect of refraction due to the directional light beams 102' exiting the light guide 110 at a light guide surface. For example, FIGS. 3A and 4B illustrate refraction (i.e., bending) of the directional light beams 102' due to a change in refractive index as the directional light beams 102' cross the first surface 110', by way of example and not limitation.

According to some embodiments, the diffractive features of the diffraction grating 122 may comprise one or both of grooves and ridges that are spaced apart from one another. The grooves or the ridges may comprise a material of the light guide 110, e.g., may be formed in a surface of the light guide 110. In another example, the grooves or the ridges may be formed from a material other than the light guide material, e.g., a film or a layer of another material on a surface of the light guide 110.

In some embodiments, the diffraction grating 122 of the multibeam element 120' is a uniform diffraction grating in which the diffractive feature spacing is substantially constant or unvarying throughout the diffraction grating 122. In other embodiments, the diffraction grating 122 may be a chirped diffraction grating. By definition, the 'chirped' diffraction grating is a diffraction grating exhibiting or having a diffraction spacing of the diffractive features (i.e., the grating pitch) that varies across an extent or length of the chirped diffraction grating. In some embodiments, the chirped diffraction grating may have or exhibit a chirp of the diffractive feature spacing that varies linearly with distance. As such, the chirped diffraction grating is a 'linearly chirped' diffraction grating, by definition. In other embodiments, the chirped diffraction grating of the multibeam element 120' may exhibit a non-linear chirp of the diffractive feature spacing. Various non-linear chirps may be used including, but not limited to, an exponential chirp, a logarithmic chirp or a chirp that varies in another, substantially non-uniform or random but still monotonic manner. Non-monotonic chirps such as, but not limited to, a sinusoidal chirp or a triangle or sawtooth chirp, may also be employed. Combinations of any of these types of chirps may also be employed.

Referring again to FIGS. 3A-3C, the polarization recycling backlight 100 further comprises a polarization conversion structure 130. The polarization conversion structure 130 is configured to convert a portion of a polarization component into another polarization component. Specifically, the polarization conversion structure 130 is configured to reflectively redirect a portion of the guided light 104 incident on the polarization conversion structure 130 at a non-zero propagation angle. In doing so, the polarization conversion structure 130 converts a portion of the second polarization component into the first polarization component. That is, the polarization conversion structure 130 converts a portion of the second polarization component of the light incident on the polarization conversion structure 130 into the first polarization in the reflected light. For example, if the first polarization component is the TE polarization component and the second component is the TM polarization component, the polarization conversion structure 130 may convert a portion of TM polarization component in the incident light into a TE polarization component in the reflected light. Thus, the portion of the first polarization component (in this example, the TE component) in the reflected light is increased.

FIG. 3C illustrates a cross-sectional view of polarization recycling backlight 100 including a polarization conversion structure 130 according to embodiments of the present invention. The polarization conversion structure 130 is configured to reflectively redirect a portion of the guided light 104 incident on the polarization conversion structure 130 at a non-zero propagation angle and convert a portion of the second polarization component of the guided light 104 into the first polarization component. In this example, the polarization conversion structure 130 is located on a second surface 110" of the light guide 110 between a plurality of polarization-selective scatterers of the polarization-selective scattering feature 120. The guided light 104 incident upon the polarization conversion structure 130 is illustrated. Further illustrated are a first vector that represents a first polarization component 104' and a second vector that represents a second polarization component 104" of the guided light 104, orthogonal to the first polarization component 104'. In particular, the first polarization component 104' is illustrated as a circle with a dot in the middle to represent a vector parallel to a first surface of the polarization conversion structure 130 and pointing into the page. The first and second polarization components 104', 104" are orthogonal to one another as well as being orthogonal to the direction of travel of the guided light 104, as illustrated in FIG. 3C. In some embodiments, the first polarization component 104' may correspond to the TE polarization component of the guided light 104, while the second polarization component 104" may correspond to the TM polarization component of the guided light 104, for example.

As illustrated in FIG. 3C, the guided light 104 is incident upon the polarization conversion structure 130 at a non-zero propagation angle. The guided light 104 is reflected or reflectively redirected by the polarization conversion structure 130 as a reflected light beam, which propagates away from the polarization conversion structure at a non-zero propagation angle substantially equal to the angle of incidence. During the reflection of guided light 104, the polarization conversion structure 130 may act as a form-birefringent material. That is, the polarization conversion structure 130 may introduce a phase retardation between two orthogonal polarization components, such as the first polarization component 104' and the second polarization component 104", or equivalently the TE polarization component 104' and the TM polarization component 104" of the incident guided light 104, in some examples. As such, the polarization conversion structure 130 may introduce about one half wavelength differential or 90 degree phase delay between the first and second polarization components 104', 104" in the incident guided light 104, according to some examples. The phase retardation between the two polarization components 104', 104" results in the conversion of a portion the TM polarization component 104" of the incident light into a TE polarization component 104' in the reflected light. As a result, the TE polarization component portion of the reflected light is augmented relative to the incident light. This is illustrated in FIG. 3C by the longer vector representing the first polarization component 104' of the light reflected from the polarization conversion structure 130. Similarly, the TM polarization component portion of the reflected light is decreased relative to the incident light, as illustrated by the smaller circle with a dot at the middle on the reflected light in FIG. 3C.

After interacting with the polarization conversion structure 130, light beam 104 continues to propagate through the light guide 110 at a non-zero propagation angle, alternately reflecting against the first and second surfaces 110', 110" of the light guide 110, as previously described. In doing so, the guided light 104 is configured to interact multiple times with the polarization conversion structure 130. During each interaction with the polarization conversion structure 130, a portion of the second polarization component 104" (e.g., the TM polarization component) is further converted into the first polarization component 104' (e.g., the TE polarization component). The guided light 104 also interacts with the polarization-selective scattering feature 120 during its propagation through the light guide 110. During interactions with the polarization-selective scattering feature 120, a portion of the first polarization or TE polarization component is selectively coupled or scattered out of the light guide 110 as the emitted light 102. The polarization-selective scattering of the portion of the first polarization component reduces or depletes the first polarization component in the guided light 104. To compensate for this loss, the depleted portion of the first polarization component in the guided light 104 is replenished through the iterative interactions with the polarization conversion structure 130. As a result, a greater amount of the first polarization component is made available to the polarization-selective scattering feature 120, resulting in a greater intensity in the emitted light 102, and a brighter polarization recycling backlight 100, according to some embodiments.

In some embodiments, the polarization conversion structure 130 is substantially optically transparent to light incident upon the structure in a direction substantially orthogonal to a surface of the light guide and the effect of the polarization conversion structure 130 on such light is minimal. Instead, the polarization conversion structure 130 is configured to interact with guided light propagating at a non-zero propagation angle and incident on the structure at an angle.

Figure 5A:
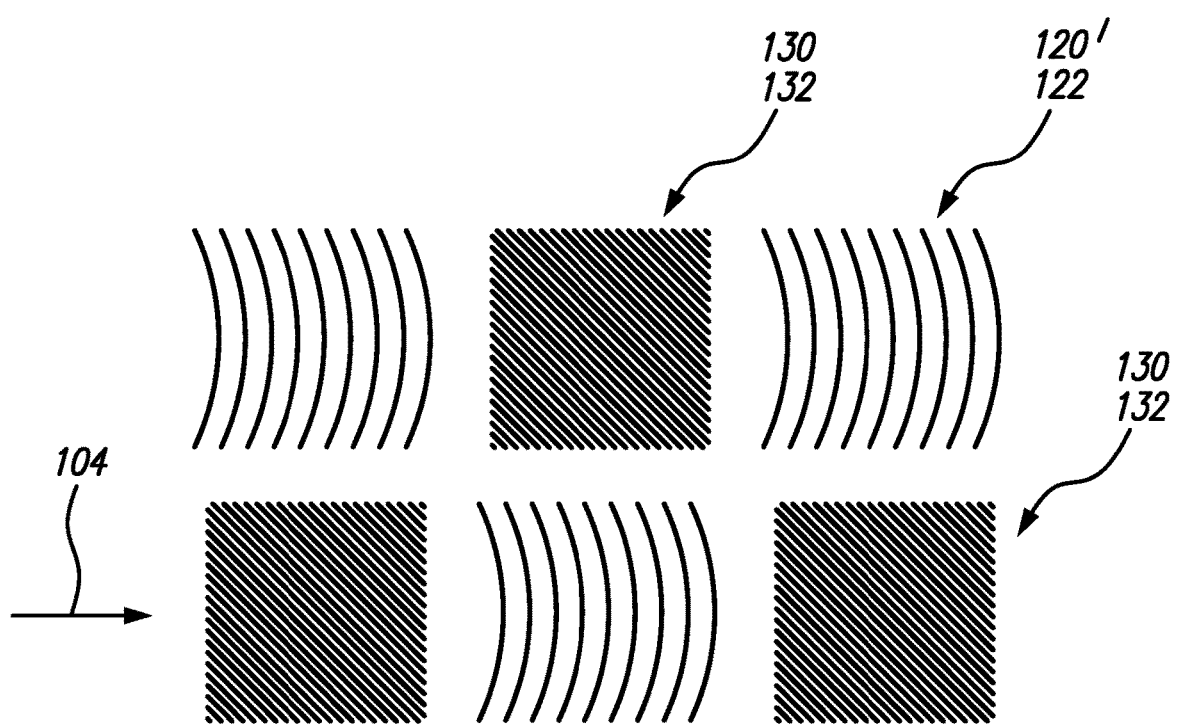
FIG. 5A illustrates a plan view of a portion of surface of a polarization recycling backlight including diffractive multibeam elements and subwavelength gratings of a polarization conversion structure in an example, according to an embodiment consistent with the principles described herein.
Figure 5B:
FIG. 5B illustrates a plan view of a subwavelength grating in an example, according to an embodiment consistent with the principles described herein.

In various embodiments, the polarization conversion structure 130 comprises a subwavelength grating 132. The subwavelength grating 132 is configured to reflectively redirect a portion of the guided light incident on the subwavelength grating 132 at a non-zero propagation angle. In doing so, the subwavelength grating 132 converts the portion of the second polarization component 104" of the guided light 104 into the first polarization component 104', as described above. FIG. 5A illustrates a plan view of a portion of surface of a polarization recycling backlight 100 including multibeam elements 120' and subwavelength gratings 132 of the polarization conversion structure 130 in an example, according to an embodiment consistent with the principles described herein. FIG. 5B illustrates a plan view of a subwavelength grating 132 in an example, according to an embodiment consistent with the principles described herein.

In some embodiments, the subwavelength grating 132 comprises a plurality of substantially parallel diffractive features. The diffractive features may be substantially similar to the diffractive features of diffraction gratings described above, in some examples. In particular, the diffractive features of the subwavelength grating 132 may comprise one or both of grooves and ridges that are spaced apart from one another. The groves and ridges may be formed in a surface of the light guide 110 or from a material other than the light guide material. However, in a subwavelength grating 132, a distance between diffractive features or equivalently, the grating pitch of the diffractive features is less than a wavelength of the guided light 104, by definition. In some embodiments, the grating pitch may be substantially less than the wavelength of the guided light 104. For example, the grating pitch of the subwavelength grating 132 may be less than half a grating pitch of the diffraction grating 122, described above. The subwavelength grating pitch provides diffractive properties that contribute to the polarization conversion properties of the subwavelength grating 132. In particular, because of the subwavelength grating pitch, the subwavelength grating 132 behaves as a form-birefringent material, or a material whose diffractive properties are a factor of an orientation of components of an incident portion of the guided light 104. That is, a polarization conversion characteristic of the subwavelength grating 132 is dependent on an orientation of components of the incident guided light 104. As described above, the guided light 104 incident on the subwavelength grating 132 may comprise a first polarization component and a second polarization component (respectively TE polarization and TM polarization, in some examples) oriented orthogonally in relation to each other. Accordingly, the subwavelength grating 132 reflects each polarization component differently according to its orientation. As such, the form-birefringence of the subwavelength grating 132 may cause a phase delay of approximately a half-wavelength in the second polarization component in relation to the first polarization component. This phase delay transforms a portion of the second polarization component of the light incident on the subwavelength grating 132 into a first polarization component in the light reflected by the subwavelength grating 132.

The grating pitch of the diffraction features of the subwavelength grating 132 further affects a diffraction order of the subwavelength grating 132. In particular, when the grating pitch is substantially subwavelength, or equivalently, the spacing between diffractive features is substantially less than a wavelength of light beam 104 incident on the subwavelength grating 132, only a zero diffraction order or equivalently, a reflection, is provided by the subwavelength grating 132. Accordingly, the guided light 104 incident on the subwavelength grating 132 is reflectively redirected by the subwavelength grating 132 at the non-zero propagation angle substantially equal to that of the incident guided light 104 (i.e., specular reflection). As described above, the reflected light comprises a greater portion of first polarization component (e.g., TE polarization) than the incident guided light 104 due to the conversion of the second polarization component of the incident light into the first polarization component of the reflected light by the subwavelength grating 132.

The diffractive features of the subwavelength grating 132 may have a grating period, grating duty cycle, grating orientation, grating pitch, and grating depth, in some examples. One or more of the grating period, the grating duty cycle, the grating orientation, the grating pitch (as described above), and the grating depth is configured to control an amount of polarization conversion of the second polarization component into the first polarization component. That is, one of more of these characteristics can be designed to affect how much of the second polarization component of the incident light is converted into the first polarization component of the reflected light. In some examples, an orientation of the diffractive features in relation to a direction of the light beam incident on the subwavelength grating 132 may affect the amount of polarization conversion.

Referring to FIG. 5B, the diffractive features of the subwavelength grating 132 are oriented at an angle with respect the y-axis on a surface of the subwavelength grating 132. In the example illustrated, the surface is the second surface 110" of the light guide 110. The subwavelength grating 132 is therefore at an angle α with respect to a projection of the direction of the guided light 104 incident on the surface of the light guide 110 (or equivalently, on the plane of the subwavelength grating 132). The orientation of the subwavelength grating 132 on the surface of the light guide 110 controls the angle of incidence a of the guided light 104 on the subwavelength grating 132 in the plane of that surface, which controls the amount of polarization in the guided light 104 that is converted by the subwavelength grating 132.

According to various embodiments of the invention, the polarization conversion structure 130 may be located on a surface of the light guide 110. Referring back to FIG. 5A, the polarization conversion structure 130 may be placed between adjacent scatterers (e.g., multibeam elements 120') of the plurality of scatterers on a surface of the light guide 110. For example, in an embodiment where the polarization-selective scattering feature 120 comprising multibeam elements 120' is located on the first surface 110' of the light guide (for example, as illustrated in FIG. 4A), the polarization conversion structure 130 may be located on the first (or top) surface 110' between the multibeam elements 120'. Alternatively, in embodiments where the polarization-selective scattering feature 120 comprising multibeam elements 120' is located on the second (or bottom) surface 110" of the light guide 110, as illustrated in FIGS. 3A-3C and FIG. 4B, the polarization conversion structure 130 may be located on the second surface 110" between multibeam elements 120' of the plurality.

In some embodiments (not illustrated), reflective islands may be provided adjacent to portions of the polarization-selective scattering feature 120. For example, reflective islands may be provided adjacent to multibeam elements 120' of the polarization-selective scattering feature 120 that comprise reflection mode diffraction gratings. The reflective islands may be provided to facilitate reflection of the incident guided light 104 and increase the intensity of emitted light 102 produced by the polarization-selective scattering feature 120, for example.

Figure 6:
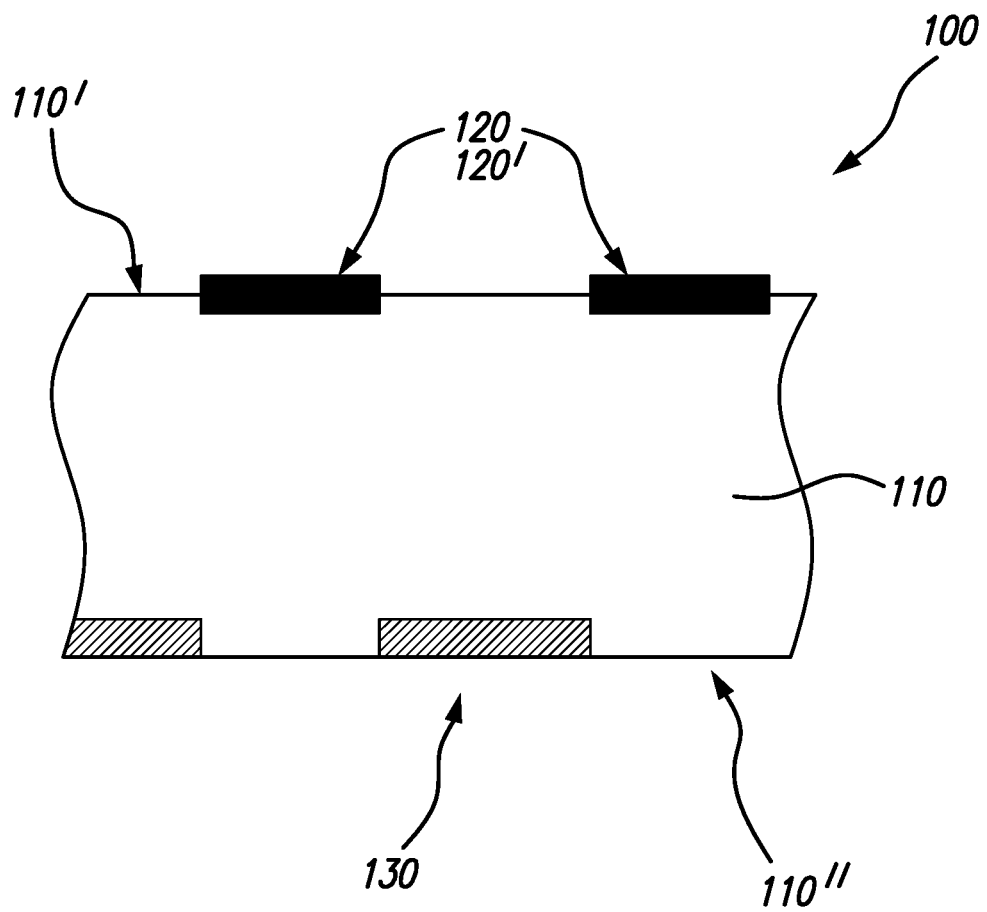
FIG. 6 illustrates a cross-sectional view of a portion of a polarization recycling backlight in an example, according to an alternative embodiment consistent with the principles described herein.

FIG. 6 illustrates a cross-sectional view of a portion of a polarization recycling backlight 100 in an example, according to another embodiment consistent with the principles described herein. In this embodiment, the polarization-selective scattering feature 120 and the polarization conversion structure 130 are located on opposite surfaces of the light guide. As illustrated, the polarization-selective scattering feature 120 comprises multibeam elements 120' configured to operate in a transmission mode that is disposed on the first surface 110' of the light guide 110. The polarization conversion structure 130 is located on the opposing surface (i.e., the second surface 110") of the light guide 110. In another embodiment (not illustrated), the polarization-selective scattering feature 120 may comprise a multibeam elements 120' located on the second surface 110" configured to operate in a reflection mode, and the polarization conversion structure 130 may be disposed on the first surface 110'. In all embodiments, guided light 104 propagating at a non-zero propagation angle alternately reflects against surfaces 110', 110" of the light guide 110, and is reflectively redirected and converted by the polarization conversion structure 130 on one of the surfaces 110', 110" of the light guide 110.

Embodiments where the polarization-selective scattering feature 120 and the polarization conversion structure 130 are located on opposite surfaces of the light guide 110 may effectively double an available surface available for the polarization-selective scattering feature 120 and polarization conversion structure 130, respectively. Further, such embodiments may permit a greater variety of arrangement for both the polarization conversion structure 130 and the polarization-selective scattering feature 120. For example, in contrast to the arrangement illustrated in FIGS. 3A-3C where the polarization conversion structure 130 is located between the multibeam elements 120' of the polarization-selective scattering feature 120, a polarization conversion structure 130 that is located on an opposite surface from the polarization-selective scattering feature 120 may occupy substantially the entire surface and provide more effective polarization conversion. Similarly, the polarization-selective scattering feature 120 is provided with more space, and therefore an intensity of the emitted light 102, for example.

According to some embodiments, the polarization conversion structure 130 is configured to provide an amount of polarization conversion of the second polarization component into the first polarization component that is a function of location along the length of the light guide 110. For example, as the guided light 104 propagates in the light guide 110, a polarization of the guided light 104 may vary with the location of the guided light 104 along the light guide 110. That is, the polarization of the guided light 104 at a particular location may differ from the polarization of the guided light 104 at a different location of the light guide 110. Such variations in polarization of the guided light 104 may occur in a manner that depends predictably on the location of the guided light along the length of the light guide 110. To account for this polarization variation in the light guide 110 and generate emitted light 102 having a substantially uniform polarization across the surface of the light guide 110, the polarization conversion structure 130 may be configured to provide an amount of polarization conversion of the second polarization component into the first polarization component that is a function of location along the length of the light guide 110, in some embodiments. For example, in regions of the light guide 110 where the guided light 104 comprises a greater portion of the first polarization component, the polarization conversion structure 130 may be configured to convert a smaller amount of the second polarization component into the first polarization component. Similarly, in regions where the guided light 104 comprises a lesser portion of the first polarization component, the polarization conversion structure 130 may be configured to convert a greater amount of the second component into the first. Accordingly, the emitted light 102 scattered out by the polarization-selective scattering feature 120 may be substantially uniform in intensity across the light guide 110.

According to some embodiments, the polarization conversion structure 130 may be configured to provide an amount of polarization conversion of the second polarization component into the first polarization component that is less than about ten percent (10%) during each reflective redirection. As previously described, the polarization conversion structure 130 is configured to convert a portion of the second polarization component of the guided light 104 incident on the polarization conversion structure 130 into the first polarization component when the guided light 104 is reflected as the reflected light. The amount of polarization conversion is the proportion of the second polarization component converted into the first. The amount of polarization conversion may be controlled by characteristics of the diffractive features of the subwavelength grating 132 of the polarization conversion structure 130, according to various embodiments. These characteristics include a grating period, grating duty cycle, grating orientation, grating pitch, and grating depth. Accordingly, one or more of the grating period, grating duty cycle, grating orientation, grating pitch, and grating depth of the subwavelength grating 132 may be configured to convert about ten percent (10%) of the second polarization component of the guided light 104 incident on the subwavelength grating 132. In some embodiments, the amount of polarization conversion may be less than about four percent (4%). For example, the amount of polarization conversion may be between about two percent (2%) and about four percent (4%).

According to some embodiments, a polarization conversion of about ten percent (10%) or less may allow the polarization recycling backlight 100 to be employed in a mode-selectable 2D/3D display. For example, a polarization recycling backlight 100 may be employed as a second backlight in mode-selectable 2D/3D display comprising two adjacent backlights. In the mode-selectable 2D/3D display, a backlight may be configured to emit diffuse or substantially broad-angle (e.g., '2D') light, and the second backlight or the polarization recycling backlight 100 described herein) may be configured to emit light as directional emitted light. The directional emitted light may comprise a plurality of directional light beams having different principal angular directions corresponding to view directions of a multiview display. As such, the directional emitted light may also be referred to as multiview or 3D emitted light. A 2D image may be provided by the mode-selectable 2D/3D display in a first mode by activating the first backlight, while a multiview or '3D' image may be provided when the second or polarization recycling backlight 100 is activated during a second mode.

Figure 7:
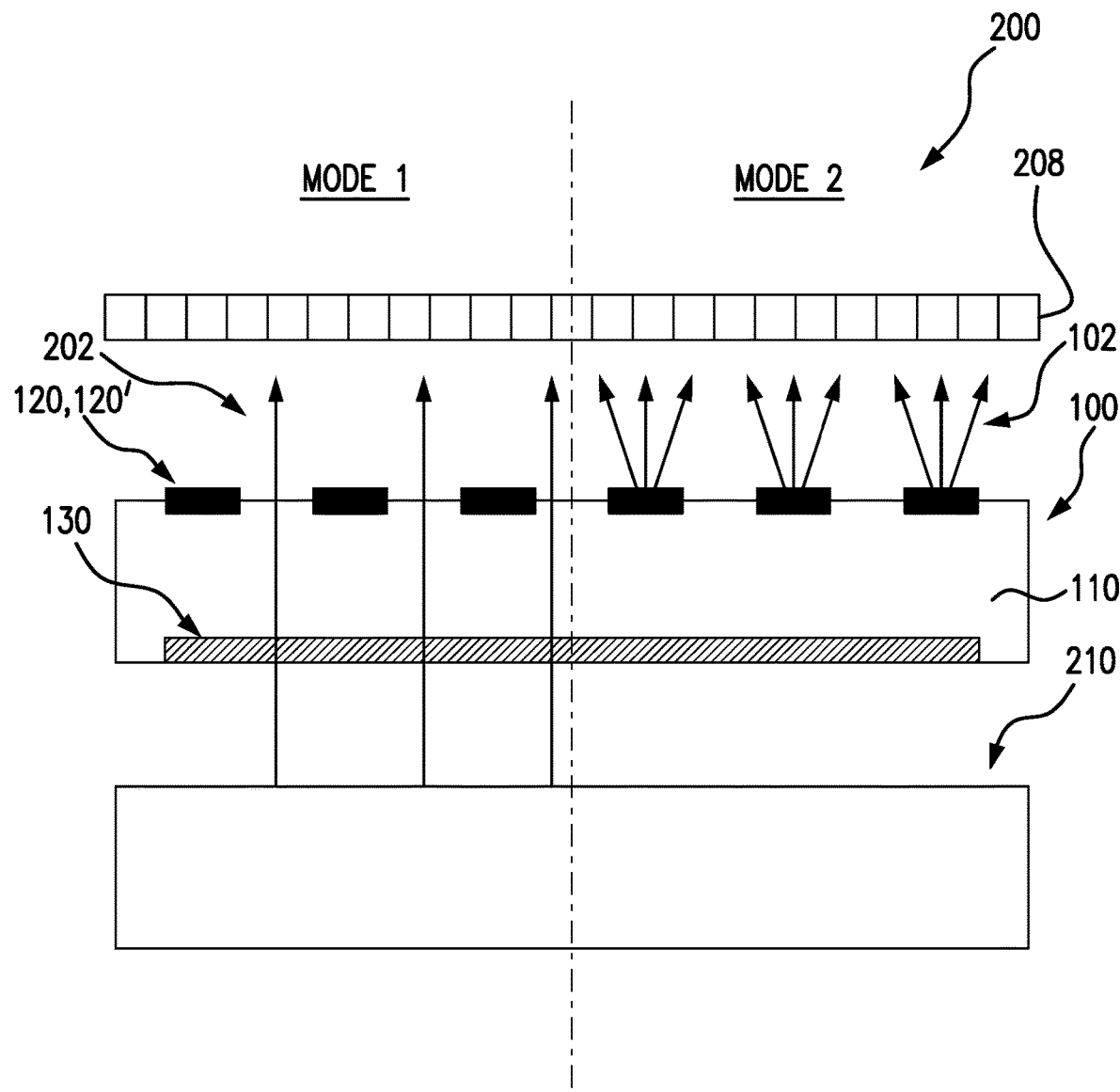
FIG. 7 illustrates a cross-sectional view of a mode-selectable 2D/3D display in an example, according to an embodiment consistent with the principles described herein.

FIG. 7 illustrates a cross-sectional view of a mode-selectable 2D/3D display 200 in an example, according to an embodiment consistent with the principles described herein. As illustrated, the mode-selectable 2D/3D display comprises a first backlight 210 adjacent to the polarization recycling backlight 100. The first backlight 210 is configured to provide broad-angle emitted light 202 during a first mode (Mode 1), while the polarization recycling backlight 100 is configured to provide emitted light 102 that is directional (i.e., directional emitted light) during a second mode (Mode 2), as illustrated. Further, as illustrated, the emitted light 102 that is directional is provided by the polarization-selective scattering feature 120 comprising a plurality of multibeam elements 120'. In various embodiments, the broad-angle emitted light 202 is emitted in a direction toward the polarization recycling backlight 100. Further, during the first mode (Mode 1), the broad-angle emitted light 202 is configured to pass through a thickness of the polarization recycling backlight 100, e.g., through the light guide 110 and the polarization-selective scattering feature 120 of the polarization recycling backlight 100.

The illustrated mode-selectable 2D/3D display 200 further comprises a light valve array 208 configured to modulate the broad-angle emitted light 202 to provide the 2D image in the first mode (Mode 1) and to modulate the emitted light 102 (or directional emitted light) to provide the multiview image during the second mode (Mode 2). According to various embodiments, the broad-angle emitted light 202 generally interacts only once with the polarization conversion structure 130 of the polarization recycling backlight 100. When the polarization conversion of the polarization conversion structure 130 is about ten percent (10%) or less, the broad-angle emitted light 202 experiences little or no polarization conversion allowing the broad-angle emitted light 202 to pass through the polarization recycling backlight 100 without a substantial effect to its polarization, according to various embodiments.

Figure 8:
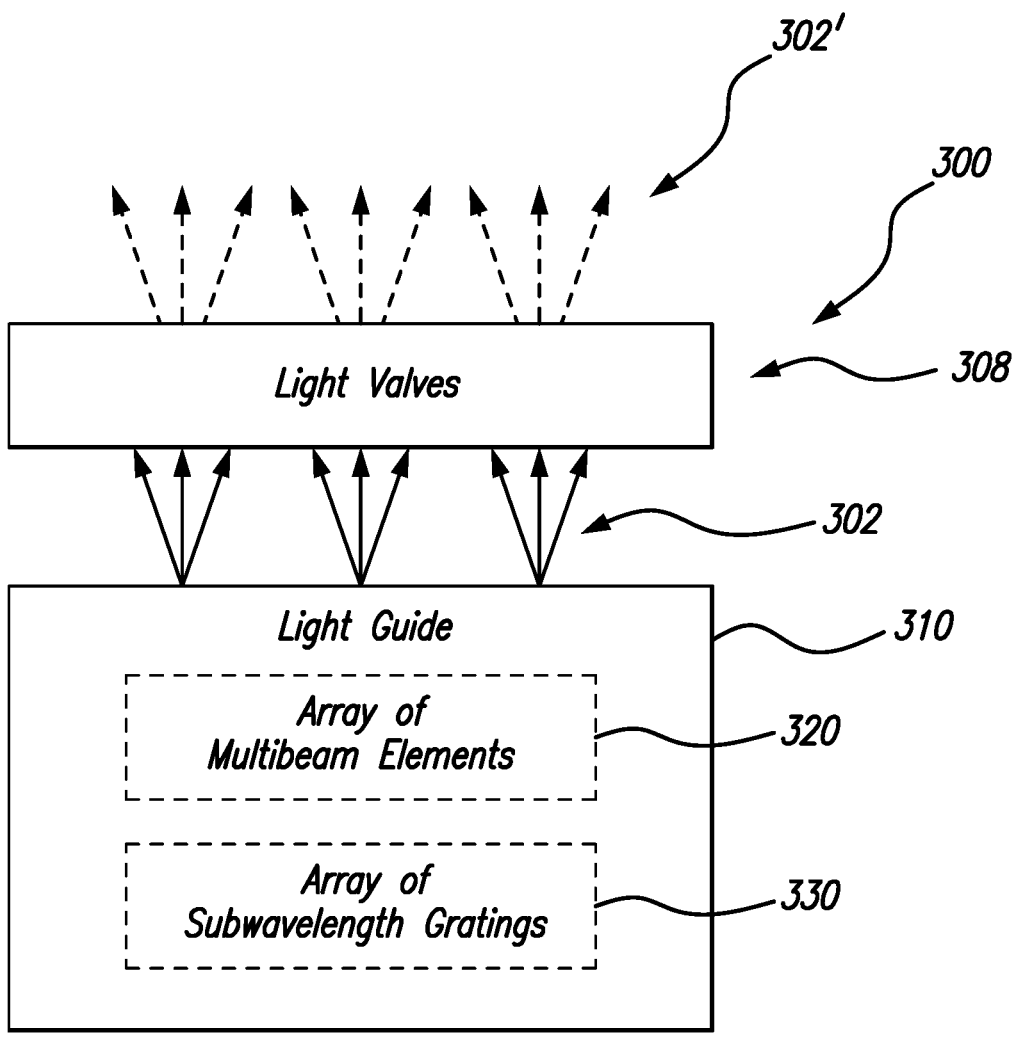
FIG. 8 illustrates a block diagram of a multiview display in an example, according to an embodiment consistent with the principles described herein.

In accordance with some embodiments of the principles described herein, a multiview display is provided. FIG. 8 illustrates a block diagram of the multiview display 300 in an example, according to an embodiment consistent with the principles described herein. According to various embodiments, the multiview display 300 employs polarization-selective scattering to provide emitted light. In particular, the multiview display selectively scatters out a portion of guided light associated with a first polarization component. Further, the multiview display 300 employs polarization conversion to transform guided light into polarized light to be selectively scattered out as emitted light comprising a plurality of directional light beams 302. Specifically, the multiview display 300 converts a portion of a second polarization component of the guided light into the first polarization component to be selectively scattered out.

As illustrated in FIG. 8, the multiview display 300 comprises a light guide 310 configured to guide light as guided light. According to various embodiments, the light guide 310 may be configured to guide the guided light using total internal reflection. Further, the guided light may be guided at a non-zero propagation angle by or within the light guide 310. In some embodiments, the light guide 310 may be substantially similar to the light guide 110 of the polarization recycling backlight 100, described above. In particular, the light guide 310 may comprise a slab of dielectric material. As such, the light guide 310 may be a plate light guide. The guided light may further comprise a first polarization component and a second polarization component, according to various embodiments. The first polarization component may be a transverse electric (TE) polarization component, and the second polarization component may be a transverse magnetic (TM) component for example.

As illustrated in FIG. 8, the multiview display 300 further comprises an array of multibeam elements 320. A multibeam element 320 of the array of multibeam elements 320 is configured to selectively scatter out a portion of the first polarization of the guided light as a plurality of directional light beams 302 having different principal angular directions. In some embodiments, the multibeam element 320 of the multibeam element array is configured to selectively scatter out of the light guide the TE polarization component of the guided light as directional light beams. Further, the different principal angular directions of the directional light beams 302 correspond to view directions of a multiview image, e.g., displayed by the multiview display 300.

In some embodiments, the array of multibeam elements 320 of the light guide 310 may be substantially similar to the polarization-selective scattering feature 120 of the above-described polarization recycling backlight 100. In particular, a multibeam element 320 of the array of multibeam elements 320 may be substantially similar to the multibeam element 120'. For example, the multibeam element 320 may comprise a diffraction grating. The diffraction grating may be substantially similar to the diffraction grating 122 of the polarization recycling backlight 100, described. As such the multibeam element 320 may be located at or adjacent to a surface of the light guide 310. For example, the multibeam element 320 may be located at a first surface of the light guide 310, where it is configured to selectively scatter out the guided light portion having the first polarization through the first surface as a transmission mode diffraction grating. In another example, the multibeam element 320 may be located at a second surface of the light guide 310, where it is a reflection mode multibeam element configured to selectively scatter the guided light portion and reflect the scattered guided light portion toward the first surface.

As illustrated in FIG. 8, the multiview display 300 further comprises an array of subwavelength gratings 330. The array of subwavelength gratings 330 is configured to convert a portion of the second polarization component of the guided light into the first polarization component. Specifically, the array of subwavelength gratings 330 is configured to reflectively redirect a portion of the guided light incident on the grating at a non-zero propagation angle. In doing so, the array of subwavelength gratings 330 converts a portion of the second polarization component of the guided light incident on the subwavelength gratings 330 into the first polarization in the reflected guided light. For example, if the first polarization component is the TE polarization component and the second component is the TM polarization component, the array of subwavelength gratings 330 may convert a portion of TM polarization component in the incident light into a TE polarization component in the reflected light. Thus, the portion of the first polarization component (in this example, the TE component) in the reflected light is increased. According to some embodiments, the array of subwavelength gratings 330 may be substantially similar to the polarization conversion structure 130 described above with respect to the polarization recycling backlight 100. In particular, a subwavelength grating 330 of the subwavelength grating array may be substantially similar to the above described subwavelength grating 132.

For example, a subwavelength grating 330 of the subwavelength grating array may comprise a plurality of substantially parallel diffractive features. In particular, the diffractive features of the subwavelength grating 330 of the subwavelength grating array may comprise one or both of grooves and ridges that are spaced apart from one another and formed in a surface of the light guide 310. Further and by definition, in a subwavelength grating 330 of the subwavelength grating array, a distance between diffractive features or equivalently, the grating pitch of the diffractive features is less than a wavelength of the guided light. In some embodiments, the grating pitch of a subwavelength grating 330 of the subwavelength grating array may be less than half a grating pitch of a diffraction grating of the multibeam element 120', described above.

The subwavelength grating pitch provides diffractive properties that contribute to the polarization conversion properties of the subwavelength grating 330 of the subwavelength grating array. In particular, the subwavelength grating 330 of the subwavelength grating array may behave as a form-birefringent material, or a material whose diffractive properties are a factor of an orientation of components of the incident light, as a result of the subwavelength grating pitch. The form-birefringence of the subwavelength grating 330 is configured to cause a phase delay of approximately a half-wavelength in the second polarization component (or TM polarization) in relation to the first polarization component (or TE polarization). This phase delay transforms a portion of the second polarization component of the light incident on the subwavelength grating 330 into a first polarization component in the light reflected on the subwavelength grating 330 of the subwavelength grating array, according to various embodiments.

As illustrated in FIG. 8, the multiview display 300 further comprises an array of light valves 308. The array of light valves 308 is configured to modulate directional light beams 302 of the plurality of directional light beams 302 to provide the multiview image. In various embodiments, different types of light valves may be employed as the light valves 308 of the light valve array including, but not limited to, one or more of liquid crystal light valves, electrophoretic light valves, and light valves based on electrowetting. In particular, directional light beams 302 from the array of multibeam elements 320 on the light guide 310 may pass through and be modulated by individual light valves 308 of the light valve array to provide modulated directional light beams 302'. Further, different ones of the directional light beams 302 having different principal angular directions are configured to pass through and be modulated by different ones of the light valves 308 in the light valve array. Dashed arrows in FIG. 8 are used to illustrate the modulated directional light beams 302' to emphasize modulation thereof.

In some embodiments, multibeam elements 320 of the multibeam element array are located on a surface of the light guide. The multibeam elements 320 of the multibeam element array may be spaced apart from one another along a length of the light guide 310. Further, subwavelength gratings 330 of the array of subwavelength gratings 330 may be located between multibeam elements 320 of the multibeam element array. In some embodiments, the array of multibeam elements 320 and the array of subwavelength gratings 330 are located on surfaces of the light guide 310 that are opposite to one another (i.e., located on opposite or opposing surfaces). For example, in embodiments as described above where a reflection mode diffraction grating is employed in a multibeam element 320, the multibeam element array may be a located at a second surface of the light guide 310 and the array of subwavelength gratings 330 may be located on the first surface opposite the second surface. Embodiments where the multibeam elements array and the subwavelength gratings array are located on opposite sides of the light guide effectively double the available surface and permit a greater variety of arrangements both arrays.

The array of subwavelength gratings 330 may be configured to provide an amount of polarization conversion of the second polarization component into the first polarization component that is less than about ten percent (10%) during each reflective redirection. The amount of polarization conversion is the proportion of the second polarization component converted into the first. The amount of polarization conversion may be controlled by characteristics of the diffractive features of the array of subwavelength gratings 330. These characteristics include a grating period, grating duty cycle, grating orientation, grating pitch, and grating depth. Accordingly, one or more of the grating period, grating duty cycle, grating orientation, grating pitch, and grating depth of the subwavelength grating 330 is configured to convert about ten percent of the second polarization of the light incident on the subwavelength grating 330. In some embodiments, the amount of polarization conversion may be less than about four percent (4%), e.g., between about 2% and about 4%.

In some embodiments, the array of subwavelength gratings 330 is substantially optically transparent to light incident upon the subwavelength grating array in a direction substantially orthogonal to a surface of the light guide 310. As such, an effect of the subwavelength gratings 330 on such incident light may be minimal. Instead, the array of subwavelength gratings 330 is configured to interact with guided light propagating at a non-zero propagation angle and incident on the gratings at an angle, according to various embodiments.

Figure 9:
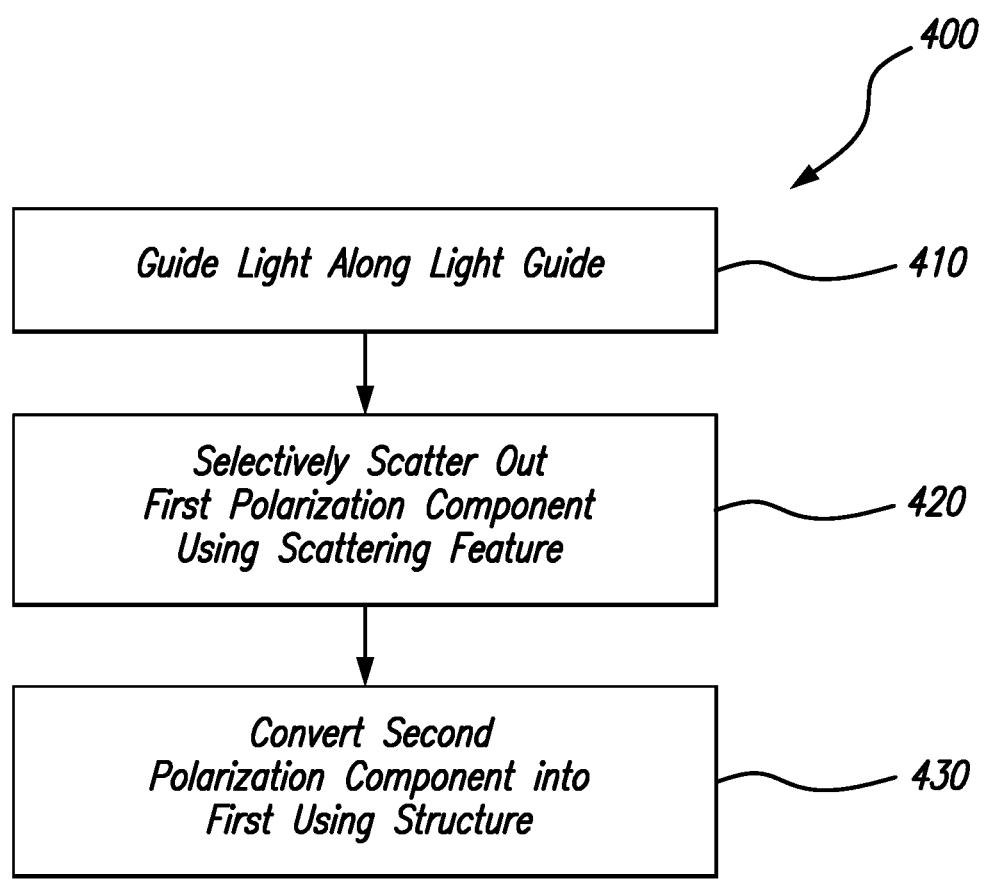
FIG. 9 illustrates a flow chart of a method of backlight operation in an example, according to an embodiment consistent with the principles described herein.

In accordance with some embodiments of the principles described herein, a method of backlight operation is disclosed. FIG. 9 illustrates a flow chart of a method 400 of polarization recycling backlight operation in an example, according to an embodiment consistent with the principles herein. As illustrated in FIG. 9, the method 400 of polarization recycling backlight operation comprises guiding 410 light along a length of a light guide as guided light. According to various embodiments, the guided light comprises a first polarization component and a second polarization component. Further, the guided light may be guided at a non-zero propagation angle within the light guide. In some embodiments, the light guide may be substantially similar to the light guide 110 described above with respect to the polarization recycling backlight 100. For example, the guided light is guided and propagates along the light guide using total internal reflection within the light guide. The first polarization component may be a transverse electric (TE) polarization component and the second polarization component may be a transverse magnetic (TM) component, for example.

The method 400 of polarization recycling backlight operation illustrated in FIG. 9 further comprises selectively scattering out 420 a portion of the first polarization component of the guided light as emitted light using a polarization-selective scattering feature. In some embodiments, the polarization-selective scattering feature may be substantially similar to the polarization-selective scattering feature 120 of the polarization recycling backlight 100, described above. In particular, the polarization-selective scattering feature used in scattering out 420 may comprise any of a variety of different structures or features that provide or are configured to produce polarization-selective scattering including, but not limited to, a diffraction grating, a reflective structure and a refractive structure as well as various combinations thereof configured to provide polarization-selective scattering.

The method 400 of polarization recycling backlight operation further comprises converting 430 a portion of the second polarization component of the guided light into the first polarization component using a polarization conversion structure comprising a subwavelength grating. In particular, a portion of the guided light incident on the polarization conversion structure at a non-zero propagation angle is reflectively redirected by the polarization conversion structure. During the reflective redirection, a portion of the second polarization component in the incident guided light is converted into the first polarization component in the reflected light. For example, when the first polarization component is a TE polarization component and the second polarization component is a TM polarization component, a portion of the TM polarization component in the incident light may be converted into a TE polarization component in the light that is reflectively redirected by the polarization conversion structure. Thus, the portion of the first polarization component (in this example, the TE component) in the reflected light may be either increased or replenished, e.g., to compensate for loss of the first polarization component due to the selective scattering out 420 by the polarization-selective scattering feature.

In some embodiments, the subwavelength grating may be substantially similar to the previously described subwavelength grating 132 of the polarization recycling backlight 100. As such, diffractive features of the subwavelength grating may comprise one or both of grooves and ridges that are spaced apart from one another and formed in a surface of the light guide. Further, a distance between diffractive features or equivalently, the grating pitch of the diffractive features is less than a wavelength of the guided light. The subwavelength grating pitch provides diffractive properties that contribute to the polarization conversion properties of the subwavelength grating. In particular, the subwavelength grating may behave as a form-birefringent material, or a material whose diffractive properties are a factor of an orientation of components of the incident light, as a result of the subwavelength grating pitch. The form-birefringence of the subwavelength grating may cause a phase delay of approximately a half-wavelength in the second polarization component (or TM polarization) in relation to the first polarization component (or TE polarization), in some embodiments. A portion of the second polarization component of the guided light incident on the subwavelength grating is thus transformed into a first polarization component in the light reflected by the subwavelength grating.

In some embodiments, the polarization-selective scattering feature comprises a plurality of multibeam elements spaced apart from one another along the light guide length. In some embodiments, selectively scattering out 420 the portion of the first polarization component comprises scattering out the portion as the emitted light using a multibeam element of the plurality of multibeam elements. In some embodiments, the multibeam element of the multibeam element plurality may be substantially similar to the multibeam element 120' of the above-described polarization recycling backlight 100. As such, the multibeam element may comprise a diffraction grating substantially similar to the diffraction grating 122 of polarization recycling backlight 100, for example. Further, the emitted light provided by the polarization-selective scattering feature comprising the plurality of multibeam elements may comprise a plurality of directional light beams having directions corresponding to view directions of a multiview display, according to various embodiments.

In some embodiments, the polarization conversion structure is located between multibeam elements of the plurality of multibeam elements on a surface of the light guide. In particular, the multibeam elements of the plurality may be located on a first surface of the light guide, with the subwavelength gratings disposed between individual multibeam elements on the surface. Alternatively, the multibeam elements and the subwavelength gratings may be located on the bottom surface, with the subwavelength gratings disposed between multibeam elements of the plurality. In yet other embodiments, the multibeam elements and subwavelength gratings or equivalently the polarization conversion structure may be located on opposite surfaces of the light guide.

Thus, there have been described examples and embodiments of a polarization recycling backlight, a method of polarization recycling backlight operation, and a multiview display that employ polarization-selective scattering features to couple out guided light as emitted light, and polarization conversion structures to convert a portion of the second polarization component of the guided light into the first polarization component. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A polarization recycling backlight comprising:
a light guide configured to guide light along a length of the light guide as guided light, the guided light comprising a first polarization component and a second polarization component;
a polarization-selective scattering feature configured to selectively scatter out a portion of the first polarization component of the guided light as emitted light; and
a polarization conversion structure comprising a subwavelength grating, the subwavelength grating being configured to reflectively redirect a portion of the guided light incident on the subwavelength grating at a non-zero propagation angle and convert a portion of the second polarization component of the guided light into the first polarization component.

2. The polarization recycling backlight of claim 1, wherein the polarization-selective scattering feature comprises a plurality of multibeam elements spaced apart from one another along the light guide length, a multibeam element of the plurality being configured to scatter out the guided light as emitted light comprising a plurality of directional light beams having directions corresponding to view directions of a multiview display.

3. The polarization recycling backlight of claim 2, wherein the plurality of multibeam elements is located on a surface of the light guide, the polarization conversion structure being located between multibeam elements of the plurality of multibeam elements.

4. The polarization recycling backlight of claim 2, wherein the multibeam element comprises a diffraction grating.

5. The polarization recycling backlight of claim 1, wherein the polarization recycling backlight is optically transparent to light incident on the polarization conversion structure in a direction substantially orthogonal to a surface of the light guide.

6. The polarization recycling backlight of claim 1, wherein the subwavelength grating comprises a plurality of substantially parallel diffractive features having a grating period, grating duty cycle, grating orientation, grating pitch, and grating depth, one or more of the grating period, the grating duty cycle, the grating orientation, the grating pitch, and the grating depth being configured to control an amount of polarization conversion of the second polarization component into the first polarization component.

7. The polarization recycling backlight of claim 1, wherein the polarization conversion structure is configured to provide an amount of polarization conversion of the second polarization component into the first polarization component that is a function of location along the length of the light guide.

8. The polarization recycling backlight of claim 1, wherein the polarization conversion structure is configured to provide an amount of polarization conversion of the second polarization component into the first polarization component that is less than about ten percent per reflective redirection.

9. The polarization recycling backlight of claim 8, wherein the amount of polarization conversion of the second polarization component into the first polarization component is between about two percent and about four percent.

10. The polarization recycling backlight of claim 1, wherein the polarization-selective scattering feature and the polarization conversion structure are located on opposite surfaces of the light guide.

11. An electronic display comprising the polarization recycling backlight of claim 1, the electronic display further comprising an array of light valves configured to modulate the emitted light to provide a multiview image.

12. A multiview display comprising:
a light guide configured to guide light as guided light comprising a first polarization component and a second polarization component;
an array of multibeam elements, a multibeam element of the array of multibeam elements being configured to selectively scatter out a portion of the first polarization component of the guided light as a plurality of directional light beams having different principal angular directions corresponding to view directions of a multiview image;

an array of subwavelength gratings configured to convert a portion of the second polarization component of the guided light into the first polarization component; and an array of light valves configured to modulate directional light beams of the plurality of directional light beams to provide the multiview image.

13. The multiview display of claim 12, wherein the multibeam element comprises a diffraction grating.

14. The multiview display of claim 12, wherein multibeam elements of the array of multibeam elements are located on a surface of the light guide and subwavelength gratings of the array of subwavelength gratings are located between the multibeam elements of the array of multibeam elements.

15. The multiview display of claim 12, wherein the array of subwavelength gratings is optically transparent to light incident on the subwavelength grating array in a direction substantially orthogonal to a surface of the light guide.

16. The multiview display of claim 12, wherein a subwavelength grating of the array of subwavelength gratings is configured to provide an amount of polarization conversion of the second polarization component into the first polarization component that is less than about ten percent.

17. The multiview display of claim 12, wherein the array of multibeam elements and the array of subwavelength gratings are located on surfaces of the light guide that are opposite to one another.

18. A method of polarization recycling backlight operation, the method comprising:
    guiding light along a length of a light guide as guided light, the guided light comprising a first polarization component and a second polarization component;
    selectively scattering out a portion of the first polarization component of the guided light as emitted light using a polarization-selective scattering feature; and
    converting a portion of the second polarization component of the guided light into the first polarization component using a polarization conversion structure comprising a subwavelength grating.

19. The method of polarization recycling backlight operation of claim 18, wherein the polarization-selective scattering feature comprises a plurality of multibeam elements spaced apart from one another along the light guide length, and wherein selectively scattering the portion of the first polarization component comprises diffractively scattering out the portion as the emitted light using a multibeam element of the plurality of multibeam elements, the emitted light comprising a plurality of directional light beams having directions corresponding to view directions of a multiview display.

20. The method of polarization recycling backlight operation of claim 19, wherein the polarization conversion structure is located between multibeam elements of the plurality of multibeam elements on a surface of the light guide.

* * * * *